(12) United States Patent
Davydov et al.

(10) Patent No.: US 12,126,564 B2
(45) Date of Patent: *Oct. 22, 2024

(54) RESOURCE MAPPING SCHEMES FOR CHANNEL STATE INFORMATION REPORTING ON NEW RADIO PHYSICAL UPLINK CONTROL CHANNEL

(71) Applicant: Apple Inc., Cupertino, CA (US)

(72) Inventors: Alexei Davydov, Nizhny Novgorod (RU); Gang Xiong, Portland, OR (US); Yushu Zhang, Beijing (CN); Victor Alexandrovich Sergeev, Nizhny Novgorod (RU); Joonyoung Cho, Portland, OR (US)

(73) Assignee: Apple Inc., Cupertino, CA (US)

( * ) Notice: Subject to any disclaimer, the term of this patent is extended or adjusted under 35 U.S.C. 154(b) by 176 days.

This patent is subject to a terminal disclaimer.

(21) Appl. No.: 17/847,595

(22) Filed: Jun. 23, 2022

(65) Prior Publication Data
US 2022/0321304 A1    Oct. 6, 2022

Related U.S. Application Data

(63) Continuation of application No. 16/977,257, filed as application No. PCT/US2018/045962 on Aug. 9, 2018, now Pat. No. 11,502,805.

(Continued)

(51) Int. Cl.
*H04L 5/00*     (2006.01)
*H04L 1/1607*   (2023.01)
(Continued)

(52) U.S. Cl.
CPC .......... *H04L 5/0053* (2013.01); *H04L 1/1671* (2013.01); *H04L 1/1861* (2013.01);
(Continued)

(58) Field of Classification Search
CPC ... H04L 5/0053; H04L 1/1671; H04L 1/1861; H04L 5/0007; H04L 5/0055;
(Continued)

(56) References Cited

U.S. PATENT DOCUMENTS 10,499,384 B2   12/2019   He et al.
10,638,462 B2    4/2020   Park et al.
(Continued)

FOREIGN PATENT DOCUMENTS

| CN | 107005374 A | 8/2017 | |
|---|---|---|---|
| WO | WO-2016163855 A1 * | 10/2016 | ............... H04L 1/00 |
| WO | 2017048215 A1 | 3/2017 | |

OTHER PUBLICATIONS

International Search Report dated Nov. 22, 2018 for International Application No. PCT/US2018/045962.
(Continued)

*Primary Examiner* — Sharmin Chowdhury
(74) *Attorney, Agent, or Firm* — Eschweiler & Potashnik, LLC

(57) ABSTRACT

An apparatus of a New Radio (NR) User Equipment (UE), a method and system. The apparatus includes one or more processors to encode a two part CSI including: encode a two part CSI including: encoding information bits of a first channel state information (CSI) type and information bits of a second CSI part to generate, respectively, encoded bits of a first CSI part and encoded bits of a second CSI part, a payload size of the second CSI part being based on encoded bits of the first CSI part and further being encoded separately from information bits of the first CSI part; and mapping the encoded bits of the first CSI part onto a first physical resource and the encoded bits of the second CSI part onto a second physical resource different from the first physical resource; and configure the two part CSI in a long or short (Continued)

PUCCH for transmission to a NR evolved Node B (gNodeB).

19 Claims, 15 Drawing Sheets

Related U.S. Application Data

(60) Provisional application No. 62/554,406, filed on Sep. 5, 2017, provisional application No. 62/543,716, filed on Aug. 10, 2017.

(51) Int. Cl.
*H04L 1/1829* (2023.01)
*H04L 5/02* (2006.01)

(52) U.S. Cl.
CPC .......... *H04L 5/0007* (2013.01); *H04L 5/0055* (2013.01); *H04L 5/0057* (2013.01); *H04L 5/023* (2013.01)

(58) Field of Classification Search
CPC ....... H04L 5/0057; H04L 5/023; H04L 5/006; H04L 5/22; H04W 24/10
See application file for complete search history.

(56) References Cited

U.S. PATENT DOCUMENTS

| | | |
|---|---|---|
| 2010/0195575 A1 | 8/2010 | Papasakellariou |
| 2014/0022991 A1 | 1/2014 | Chu |
| 2014/0078974 A1* | 3/2014 | Falahati .............. H04W 52/146 370/329 |
| 2014/0286276 A1 | 9/2014 | Lunttila et al. |
| 2017/0366322 A1 | 12/2017 | Ahn |
| 2018/0097609 A1 | 4/2018 | Tiirola |
| 2018/0124815 A1* | 5/2018 | Papasakellariou .... H04L 1/1671 |
| 2018/0198569 A1* | 7/2018 | Lyu ....................... H04W 72/21 |
| 2020/0178241 A1 | 6/2020 | Wu |
| 2020/0228289 A1* | 7/2020 | He ........................ H04L 1/1861 |
| 2020/0236700 A1 | 7/2020 | Matsumura |

OTHER PUBLICATIONS

International Preliminary Report on Patentability dated Feb. 11, 2020 for International Application No. PCT/US2018/0145962.
"CSI feedback mechanism on PUCCH." Agenda Item: 5.1.2.3.4. Source: ZTE. 3GPP TSG RAN WG1 NR AdHoc #2, Qingdao, China, Jun. 27-30, 2017. R1-1710190.
"CSI Parameters and Multiplexing." Agenda Item: 5.1.2.3.4. Source: Samsung. 3GPP TSG RAN WG1 NR Ad-Hoc#2, Qingdao, China, Jun. 27-30, 2017. R1-1710672.
"UCI multiplexing on PUSCH." Agenda Item: 5.1.3.2.5.1. Source: Nokia, Alcatel-Lucent Shanghai Bell. 3GPP TSG RAN NR Ad-Hoc #2, Qingdao, P.R. China, Jun. 27-30, 2017. R1-1710899.
"On Type I and Type II CSI Feedback Using PUCCH." Agenda Item: 5.1.2.3.4. Source: Qualcomm Incorporated. 3GPP TSG RAN WG1 NR Ad-Hoc#2, Jun. 27-30, 2017, Qingdao, China. R1-1711165.
Non-Final Office Action dated Mar. 16, 2022 in connection with U.S. Appl. No. 16/977,257.

* cited by examiner

Table 1. Examples of partition of CSI reporting

|  | First CSI type | Second CSI type |
|---|---|---|
| Option 1 | RI/CRI and PMI | CQI |
| Option 2 | RI and CRI | PMI and CQI |

Table 2a. Examples of partition of CSI reporting if maximum number of codeword is 1

|  | First CSI type | Second CSI type |
|---|---|---|
| Option 3 | RI/CRI and PMI, CQI | - |
| Option 4 | RI, CQI and CRI | PMI |

RESOURCE MAPPING SCHEMES FOR CHANNEL STATE INFORMATION REPORTING ON NEW RADIO PHYSICAL UPLINK CONTROL CHANNEL

CROSS REFERENCE TO RELATED APPLICATION

This application is a continuation of U.S. application Ser. No. 16/977,257 filed Sep. 1, 2020, which is a National Phase entry application of International Patent Application No. PCT/US2018/045962 filed on Aug. 9, 2018, which claims the benefit of and priority from U.S. Provisional Patent Application No. 62/543,716 entitled "Resource Mapping Scheme for Channel State Information (CSI) Reporting on New Radio (NR) Physical Uplink Control Channel (PUCCH)," filed Aug. 10, 2017, and from U.S. Provisional Patent Application No. 62/554,406 entitled "System and Methods on Resource Mapping Scheme for Channel State Information Reporting on New Radio Physical Uplink Control Channel," filed Sep. 5, 2017, the entire disclosures of which are incorporated herein by reference.

TECHNICAL FIELD

This disclosure generally relates to Channel State Information (CSI) reporting in Physical Uplink Control Channel (PUCCH) in a New Radio (NR) network.

BACKGROUND

Mobile communication has evolved significantly from early voice systems to today's highly sophisticated integrated communication platform. The next generation wireless communication system, 5C, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RAT) to enrich people lives with better, simple and seamless wireless connectivity solutions. NR will enable everything connected by wireless and deliver fast, rich contents and services. In NR, short and long physical uplink control channel (PUCCH) can be used to carry uplink control information (UCI). The UCI may include scheduling request (SR), hybrid automatic repeat request-acknowledgement (HARQ-ACK) feedback, channel state information (CSI) report, e.g., channel quality indicator (Cal), pre-coding matrix indicator (PMI), CSI resource indicator (CRI) and rank indicator (RI) and/or beam related information (e.g., LI-RSRP (layer 1—reference signal received power)). As agreed in NR, periodic CSI reporting can be carried by either short or long PUCCH, and further that PUCCH reporting is to be contained in a single slot.

Improved mechanisms in NR are needed to address receiver efficiency in the context of CSI reporting.

DETAILED DESCRIPTION

Figure 1:
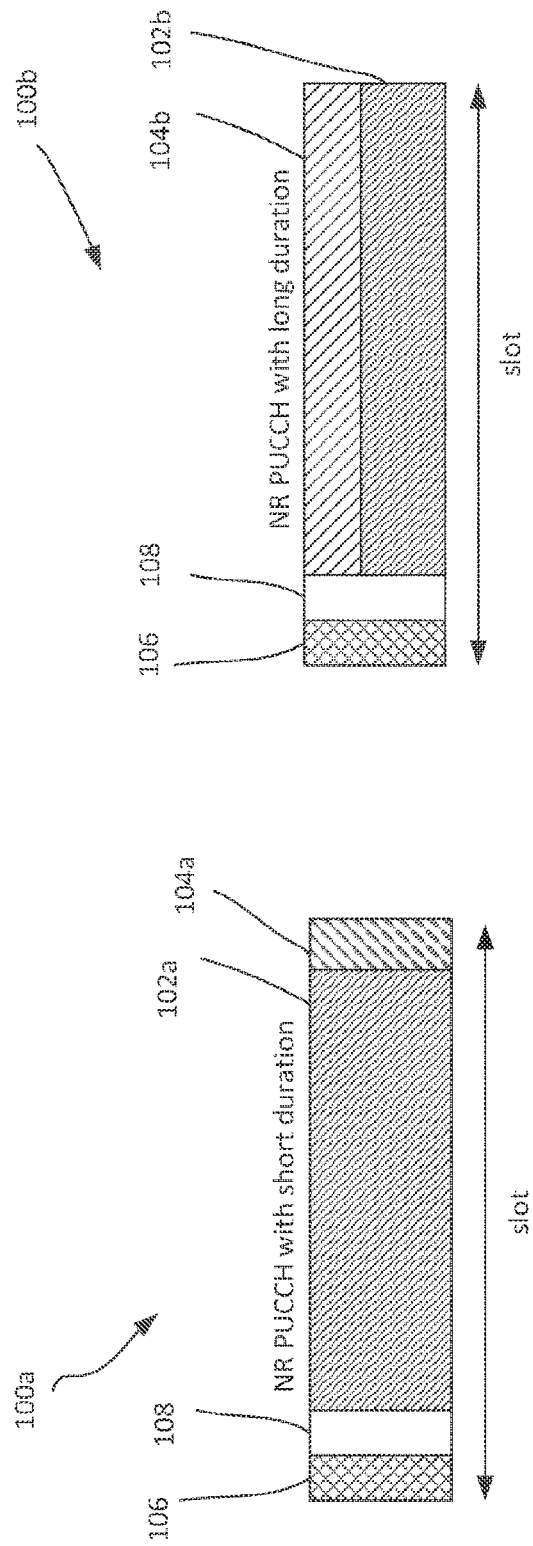
FIGS. 1A and 1B show respective signaling diagrams with NR physical uplink control channel (PUCCH) with short duration and PUCCH with long duration 1 within an UL slot.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and processes are omitted so as not to obscure the description of the various embodiments with unnecessary detail. For the purposes of the present document, the phrase "A or B" means (A), (B), or (A and B).

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL)

transmission. Standards and protocols that use orthogonal frequency-division multiplexing (OFDM) for signal transmission include the third-generation partnership project {3GPP) long term evolution (LTE) and New Radio (NR), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as Wi-Fi.

In 3GPP radio access network (RAN) Long Term Evolution (LTE) and NR systems, the node may be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission may be a communication from the node (e.g., eNodeB) to the wireless device (e.g., UE), and the uplink (UL) transmission may be a communication from the wireless device to the node.

In LTE and NR, data may be transmitted from the base station to the UE via a physical downlink shared channel (POSCH), and from the UE to the base station via a physical uplink shared channel (PUSCH). A physical downlink control channel (PDCCH) may be used to provide control information regarding a downlink POSCH. A physical uplink control channel (PUCCH) may be used to acknowledge that data was received. Downlink and uplink channels or transmissions may use time-division duplexing (TDD) or frequency-division duplexing (FDD). Time-division duplexing (TDD) is an application of time-division multiplexing (TDM) to separate downlink and uplink signals. In TDD, downlink signals and uplink signals may be carried on a same carrier frequency (i.e., shared carrier frequency) where the downlink signals use a different time interval from the uplink signals, so the downlink signals and the uplink signals do not generate interference for each other. Frequency Division Multiplexing (FDM) is a type of digital multiplexing in which two or more bit streams or signals, such as a downlink or uplink, are transferred apparently simultaneously as sub-channels in one communication channel, but are physically transmitted on different resources. In frequency-division duplexing (FDD), an uplink transmission and a downlink transmission may operate using different frequency carriers (i.e. separate carrier frequency for each transmission direction). In FDD, interference may be avoided because the downlink signals use a different frequency carrier from the uplink signals.

FIGS. 1A and 1B show respective signaling diagrams 100a and 100b of respective signals with NR PUCCH with short duration 104a and PUCCH with long duration 104b within an UL data slot in legacy implementations. For NR PUCCH with short duration 104a, NR PUCCH 104a and PUSCH 102a are multiplexed in a time division multiplexing (TDM) manner, which signal configuration can be used for low latency applications. For NR PUCCH with long duration 104b, multiple OFDM symbols can be allocated for NR PUCCH 104b to improve link budget and uplink coverage for the control channel. More specifically, for the UL data slot, NR PUCCH 104b and PUSCH 102b can be multiplexed in a frequency division multiplexing (FDM) fashion. Note that in the figure, in order to accommodate the downlink (DL) to uplink (UL) and UL to DL switching time and round-trip propagation delay, a guard period (GP) 108 is inserted between NR physical downlink control channel (NR PDCCH) 106 and NR physical uplink shared channel (NR PUSCH) 102a/102b or NR physical uplink control channel (NR PUCCH) 104b in case when NR PUSCH and NR PUCCH are multiplexed in a FDM manner.

Short and long PUCCH can be used to carry uplink control information (UCI). Further, the UCI in a PUCCH may include a scheduling request (SR), a hybrid automatic repeat request-acknowledgement (HARQ-ACK) feedback, a channel state information (CSI) report, e.g., channel quality indicator (Cal), pre-coding matrix indicator (PMI), CSI resource indicator (CRI) and rank indicator (RI) and/or beam related information (e.g., LI-RSRP (layer 1—reference signal received power)).

As agreed in NR, periodic CSI reporting may be carried by both short and long PUCCH. In addition, it has been agreed that PUCCH reporting is to be contained in a single slot. Given that payload size of a PMI and a CQI depends on RI and CRI, some demonstrative embodiments define separate coding for RI/CRI and PMI/CQI.

Some demonstrative embodiments provide at least two options with respect to coding schemes on CSI reporting. According to a first option, the RI/CRI and PMI with potential zero padding are jointly coded, while separate coding is applied for CQI. According to a second option, the RI is jointly coded with CRI, while separate coding is applied for RI/CRI and PMI/CQI. For both options, a NR evolved Node B (gNodeB) may first decode RI/CRI or PMI, and, subsequently, determine the payload size of CQI and/or PMI on PUCCH. As a result, the gNodeB will no longer need to perform blind decoding on the PUCCH, and, as a result, implementation on the receiver side may be simplified while ensuring alignment between the gNodeB and the UE regarding CSI reporting.

Some embodiments herein disclose resource mapping schemes for CSI reporting on PUCCH. According to some embodiments, where separate coding is applied as between RI/CRI, PMI and/or CQI, separate resource mapping for CSI reporting on PUCCH may be applied. Some embodiments in particular may be directed to: resource mapping schemes for CSI reporting on short PUCCH, resource mapping schemes for CSI reporting on long PUCCH, and coding and resource mapping schemes when HARQ-ACK and/or SR is multiplexed with CSI reporting. "Resource" as used herein is meant to refer to a physical resource such as a physical resource in a time and/or frequency domain.

Resource Mapping Scheme for CSI Reporting

Figure 2:
FIG. 2 depicts a table showing coding options for a two-part channel state information (CSI) according to one embodiment.

Where, according to some embodiments, separate coding is be applied as between RI/CRI, PMI and/or CQI, for the purpose of CSI reporting on PUCCH, it can be assumed that separate coding is applied to achieve a two-part CSI including encoding symbols of a first CSI type or CSI part and separately encoding symbols of a second CSI type or CSI part. More specifically, as illustrated in FIG. 2, in the first option, as suggested in Table 1 at 200, the first CSI part can include RI/CRI and PMI, and the second CSI part can include CQI. Alternatively, in the second option, the first CSI part can include RI and CRI, and the second CSI part can include PMI and CQI. It is to be understood that the partition of CSI reporting in two CSI parts or as a two-part CSI is not limited to the aforementioned options.

According to one embodiment, the payload size for the first CSI part may be predetermined, for example specified in NR, with potential zero padding of the same size, with the zero padding depending on the configuration of the first CSI part. The payload size for the second CSI part may be variable, and may for example be derived based on the content of the first CSI part.

As noted previously, independent resource mapping may, according to some embodiments, be applied for separately coded CSI parts for CSI reporting on PUCCH. By way of example, such resource mapping may include the starting resource block (RB) and/or the number of resource blocks (RBs), and/or the starting symbol and/or the number of symbols for the first CSI part. Resource mapping for separately coded CSI parts may, according to some embodiments, be configured by higher layers, such as via UE specific radio resource control (RRC) signaling. In addition, resource mapping including the starting RB and/or number of RBs and/or the starting symbol and/or the number of symbols for the second CSI part may be configured by higher layers via UE specific RRC signaling as previously suggested, or may depend on the content of the first CSI part, or may depend on a combination of UE specific RRC signaling and the content of the first CSI part. According to one example, the starting RB for the second CSI part may be configured by higher layers, while the number of RBs may be determined in accordance with the content of the first CSI part.

According to one embodiment, a gNodeB may first decode the first CSI part based on the configured resource mapping on PUCCH, determine the resource mapping of the second CSI part based on the content of the first CSI part, and subsequently, decode the second CSI part on the determined resource for the second CSI part.

A resource mapping scheme for CSI reporting on PUCCH may, according to one embodiment, include a device of a UE mapping encoded bits of a first CSI part onto a first physical resource based on higher layer signaling, and mapping encoded bits of a second CSI part onto a second resource based the content of the first CSI part.

According to some embodiments, the physical resource allocated for the transmission of the first and second CSI parts on PUCCH may be multiplexed in a time division multiplexing (TDM) manner, or in a frequency division multiplexing (FDM) manner, or using a combination of TDM and FDM.

According to some embodiments, resource mapping schemes may be based on whether short or long PUCCH is used, and whether HARQ-ACK is multiplexed with CSI reporting.

Figure 3:
FIG. 3 depicts a table showing coding options for a two-part CSI according to another embodiment.

Referring now to FIG. 3, Table 1a at 300, two additional options, options 3 and 4, are shown for resource mapping of CSI reporting according to some embodiments. With respect to option 3, if the maximum number of layers is equal to or smaller than the maximum number of layers for a codeword, meaning that the maximum number of codeword may be 1, all the feedback information on UCI including CSI, RI, CRI, PMI and CQI, may be jointly coded. According to option 4, the PMI may be carried by the second CSI part, since the number of the bits in the PMI may be determined by the number of bits in RI.

According to some embodiments, the PMI may not be reported for some transmission schemes, such as those aiming for transmit diversity, or such as non-codebook based transmissions to name a few. According to some embodiments, CRI may not be reported if the number of CSI resource is 1, and RI may not be reported if the maximum number of layers is 1.

According to one embodiment, to support subband precoding, the subband PMI and/or subband CQI can be reported, which may be reported with second CSI part or by a third CSI type. In one option, both wideband CSI and subband PMI and/or CQI can be reported by long PUCCH together. In another option, the wideband CSI can be reported by short PUCCH and subband PMI and/or CQI can be reported by long PUCCH.

Embodiment Set Two: Resource Mapping Scheme for CSI Reporting on Short PUCCH

Some embodiments of resource mapping schemes for CSI reporting on short PUCCH are provided below.

According to some embodiments, physical resources allocated respectively for the first CSI part and for the second CSI part may be multiplexed in a FDM manner on short PUCCH. Further, according to some embodiments, they may be interleaved at a RB level or at a resource element (RE) level.

When physical resources allocated respectively for the first and second CSI parts are interleaved at a RB level, according to one embodiment, encoded bits of the first CSI part may be mapped in a centered RB(s) of allocated resource for short PUCCH. In this regard, better channel estimation performance is expected for the first CSI type, which may help to improve the decoding performance for the first CSI part. Alternatively, depending on the payload size of the first CSI part, resources allocated for the first CSI part can be distributed in the allocated resource on short PUCCH.

According to one embodiment, in the event that physical resources allocated respectively for the first and second CSI parts are interleaved at a RE level, encoded bits of the first CSI part may be mapped in the REs which may be in the middle of allocated resources, or in the REs which may be close to Demodulation Reference signal (DM-RS). The above embodiment advantageously helps to improve channel estimation performance and hence decoding performance on the gNodeB side for the first CSI part.

Figure 4:
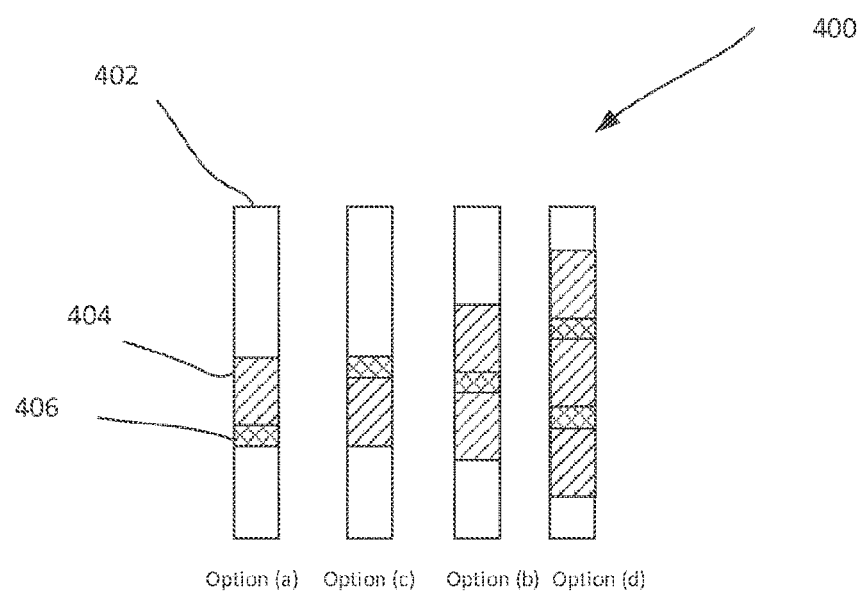
FIG. 4 illustrates four examples of resource allocations when two CSI parts are multiplexed in a frequency division multiplexing (FDM) manner at a resource block (RB) level according to one embodiment.

FIG. 4 illustrates 4 examples 400 of resource allocations when two CSI parts are multiplexed in a FDM manner in a RB level. In FIG. 4, each of Option (a), Option (b), Option (c) and Option (d) shows a symbol 402, with each symbol 402 including one or more encoded bits of CSI part 1 406, and one or more instances of encoded bits of CSI part 2 404. In Option (a), in a given symbol 402, a physical resource for encoded bits of the first CSI part 406 may be allocated at a lower part of the resource (here symbol 402), in the frequency domain, than a physical resource for encoded bits of the second CSI part 404. In Option (b), in a given symbol 402, a physical resource for encoded bits of the first CSI part 406 may be allocated at a higher part of the resource (here symbol 402), in the frequency domain, than a physical resource for encoded bits of the second CSI part 404. In Option (c), a physical resource for encoded bits of the first CSI part may be allocated in the middle, in the frequency domain, of physical resources for encoded bits of the second CSI part. In Option (d), in a given RB 402, a physical resource for the encoded bits of the first CSI part 406 may be allocated in the middle, in the frequency domain, of physical resources for encoded bits of the second CSI part. The physical resources 406 and 404 may further be distributed in the frequency domain as shown.

According to another embodiment, resources respectively allocated for encoded bits of the first and second CSI parts may be multiplexed in a FDM manner, and may further be distributed in the frequency domain on short PUCCH. Alternatively, two separate/distinct PUCCHs may be used to carry the first and second CSI parts, respectively. The two distinct PUCCHs may be multiplexed in a FDM manner in contiguous or in non-contiguous RBs.

Figure 5:
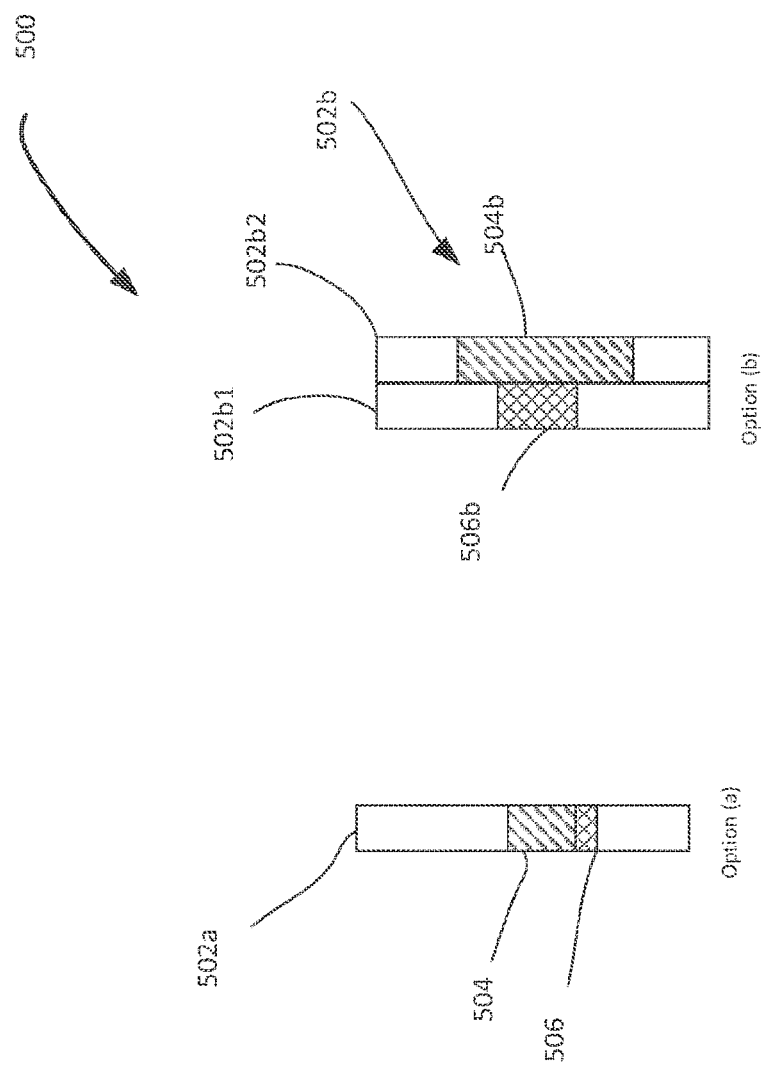
FIG. 5 illustrates two examples of resource allocations when two CSI parts are multiplexed in a FDM manner and in a TDM manner, respectively according to one embodiment involving short PUCCH.

FIG. 5 illustrates two examples 500 of resource allocations when two CSI parts are multiplexed in a FDM manner and in a TDM manner, respectively, for short PUCCH. In Option (a), a symbol 502a, is shown including encoded bits of CSI part 1 506, and encoded bits 504 of CSI part 2, similar to Option (a) of FIG. 4 described above. In Option (b), two symbols 502b1 and 502b2 are shown, with 502b1 including encoded bits of CSI part 1506b, and slot 502b including encoded bits of CSI part 2 504b. Thus, in Option (b), the physical resources for the encoded bits of respective CSI parts are multiplexed in a TDM manner for short PUCCH over two symbols. The above may be realized by a two-symbol PUCCH as shown, where the first CSI part is mapped in the first symbol and the second CSI part is mapped in the second symbol of the two-symbol PUCCH. Alternatively, two separate PUCCHs may be used to carry the first and second CSI part, respectively, and the two separate PUCCHs may be multiplexed in a TDM manner in different symbols within one slot. Note that these two separate PUCCHs may be based on 1-symbol or 2-symbol PUCCH depending on configuration or payload size.

Resource Mapping Scheme for CSI Reporting on Long PUCCH

Embodiments for resource mapping schemes for CSI reporting on long PUCCH are provided below.

Figure 6:
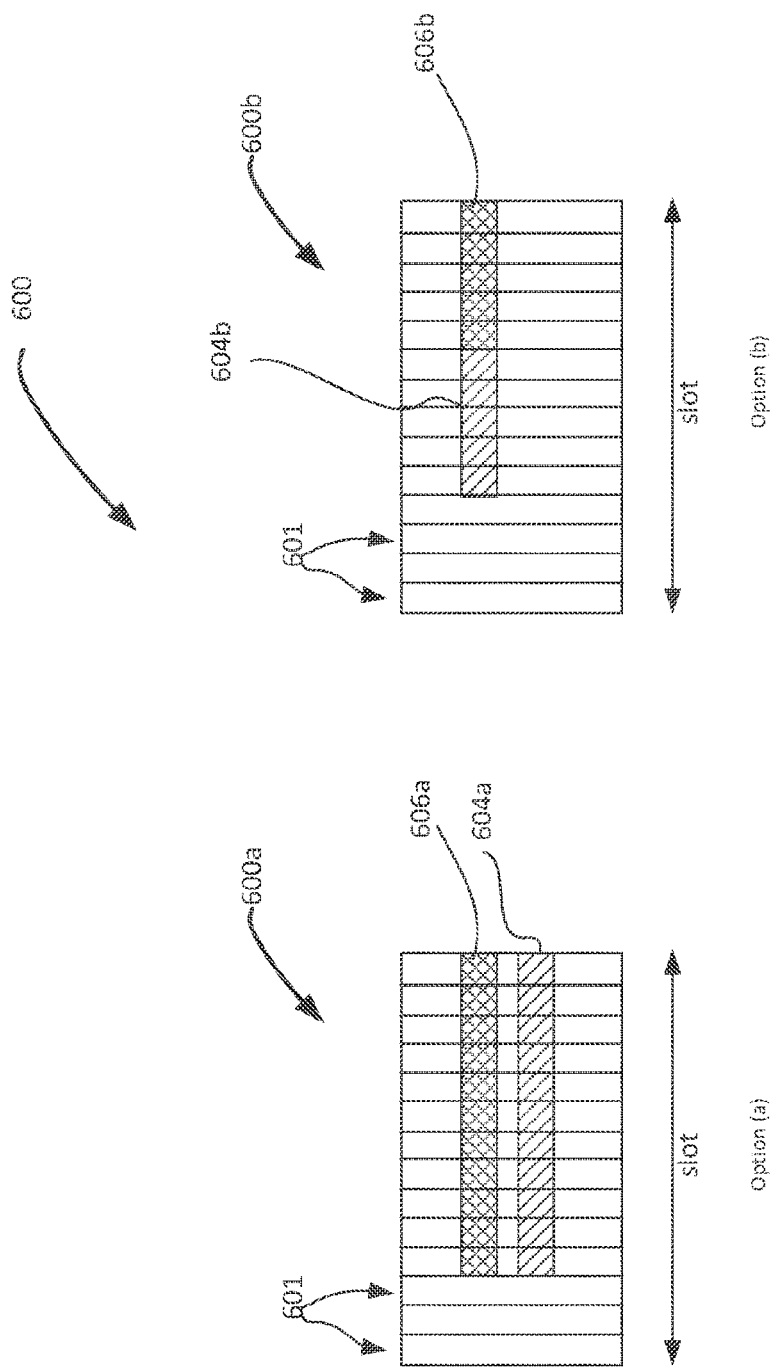
FIG. 6 shows resources respectively allocated for encoded bits of first and second CSI parts that are multiplexed in a FDM manner or in a TDM manner according to one embodiment involving long PUCCH.

Referring to FIG. 6, according to some embodiments, resources respectively allocated for encoded bits of the first and second CSI parts may be multiplexed in a FDM manner as shown in Option (a), or in a TDM manner as shown in Option (b), on long PUCCH. FIG. 6 shows a signaling diagram 600 including symbols 600a/b, each symbol including a slot having 14 symbols 601. As seen in particular in Option (a), physical resources allocated for encoded bits of the first CSI part 606a are multiplexed in a FDM manner in a long PUCCH with encoded bits of the second CSI part 604a. In Option (b), physical resources allocated to encoded bits of the first CSI part 606b are multiplexed in a TDM manner in a long PUCCH with encoded bits of the second CSI part 604b.

Alternatively, two separate long PUCCHs may be used to carry the first and second CSI parts, respectively. The two long PUCCHs may be multiplexed in a FDM manner in contiguous or non-contiguous RBs, or they may be multiplexed in a TDM manner.

Figure 7:
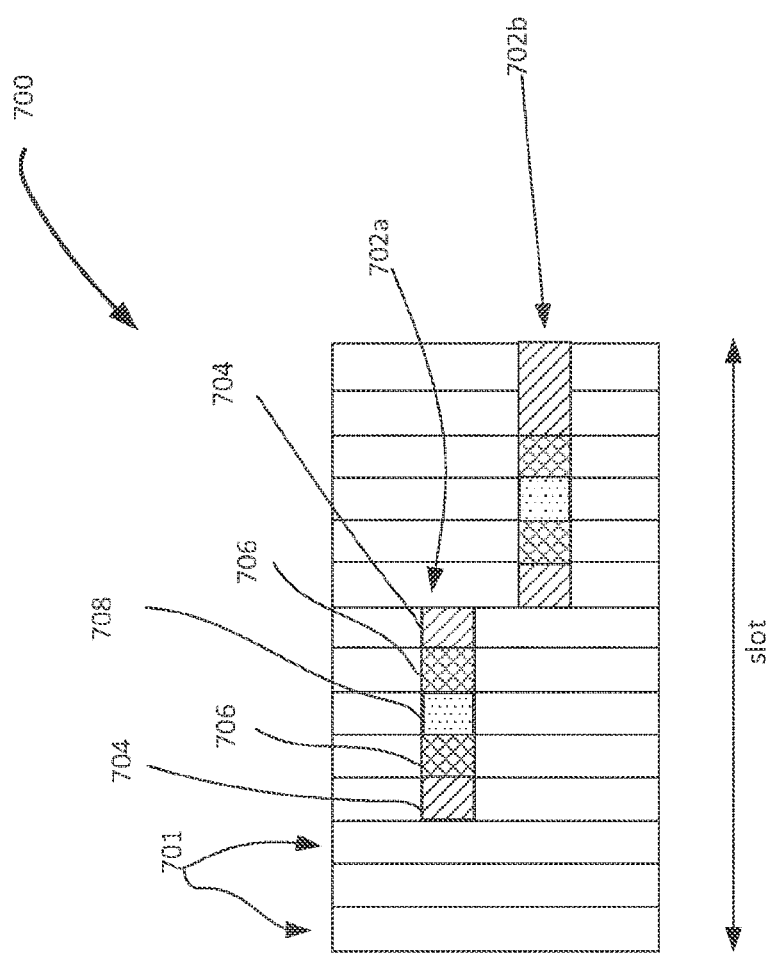
FIG. 7 illustrates one such example of resource allocations when two CSI parts are multiplexed in a TDM manner in different symbols for long PUCCH

In yet another embodiment, as shown by way of example in FIG. 7, in each frequency hop (with each change in allocated resources in the frequency domain), the resource allocated for the encoded bits of the first CSI part may be located, in a TDM manner, prior to or after the resource allocated for the encoded bits of the second CSI part. Alternatively, in each frequency hop, the resource allocated for the transmission of the first CSI type may be located, in a TDM and/or FDM manner, adjacent to or at each side of to the DM-RS, which can help to improve channel estimation performance and hence decoding performance for the first CSI part on the receiver/gNodeB side.

FIG. 7 illustrates one such example of resource allocations when two CSI parts are multiplexed in a TDM manner in different symbols for long PUCCH. In FIG. 7, a signaling diagram 700 is shown including a slot having 14 symbols 701. In FIG. 7, two sets 702a and 702b of CSI signals are shown, with each set including resources allocated to encoded bits of CSI part 1 706, resources allocated to encoded bits of CSI part 2 704, and resources allocated to encoded bits of a DM-RS signal 708. Although only one CSI part is included within a symbol duration in the exemplary mapping of FIG. 7, the first and second CSI parts can be multiplexed in TDM manner within a symbol duration and thus the boundary between them can be located within the symbol duration. The shown CSI signals in FIG. 7 may be part of the same UCI and CSI report within a long PUCCH.

In another embodiment, the amount of resources in terms of resource element (REs) or physical resource blocks (PRBs) for the transmission of encoded bits for the first CSI part or the second CSI part can be predefined in the specification, or configured by higher layer via NR minimum system information (MSI), NR remaining minimum system information (RMSI), NR system information block (SIB) or radio resource control (RRC) signaling. In another option, a configured parameter β can be defined as the ratio between the amount of the resource for the first CSI part and overall resource for all CSI reports on PUCCH.

In one example, one or more processors of the UE may derive the amount of the resource for the first CSI part transmission according to Equation (1) below:

$$N_{RE}^{CSI_1} = \lceil \beta \cdot N_{RE} \rceil \qquad \text{Eq(1)}$$

where $N_{RE}^{CSI_1}$ represents the number of REs allocated for the first CSI part, $N_{RE}$ represents the overall number of REs for CSI on long PUCCH transmission (excluding DM-RS for long PUCCH) on a whole duration of the PUCCH transmission, or in each frequency hop of the CSI transmission in the event that frequency hopping is used (see for example FIG. 7). $N_{RE}$ may be calculated based on the number of symbols and RBs allocated for PUCCH.

According to one embodiment, the encoded bits of the first CSI part may first be mapped to the resource (such as a symbol) allocated for long PUCCH which are adjacent to or at each side of to the DM-RS symbols until those symbols fill in all the resource allocated for the first CSI part in the frequency domain. A remaining portion of the frequency domain in that resource (such as in that symbol) may then be followed by the second CSI part in that same resource. Depending on whether time first or frequency first mapping is used for the transmission of long PUCCH, encoded bits of the first CSI part may be mapped in time first or frequency first manner accordingly. Further, first CSI or second CSI part may be repeated in two frequency hops if frequency hopping is employed.

Coding and Resource Mapping Scheme when HARQ-ACK and/or SR is Multiplexed with CSI Reporting Some embodiments of coding and resource mapping schemes when HARQ-ACK feedback and/or SR are multiplexed with CSI reporting are provided below.

According to some embodiments, HARQ-ACK feedback and/or SR may be jointly encoded with the first CSI part, optionally using zero padding to match a predetermined payload size. Separate coding may be applied to the second CSI part, and, in addition, separate resource mapping schemes may be employed for the transmission of encoded bits for, on the one hand, a concatenation of HARQ-ACK feedback and/or SR and the first CSI part, and, on the other hand, the second CSI part. The resource mapping schemes as mentioned above for short and long PUCCH may be applied for the above option.

Figure 8:
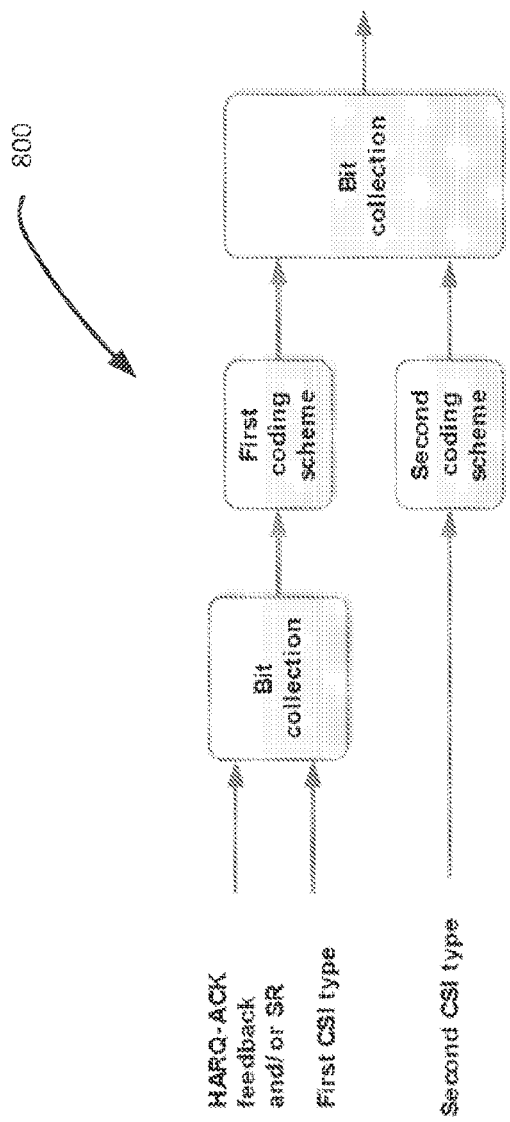
FIG. 8 depicts a flow diagram of a coding scheme for instances where hybrid automatic repeat request acknowledgment (HARQ-ACK) and/or SR are to be multiplexed with CSI reporting.

FIG. 8 illustrates one option of a coding scheme 800 for instances where HARQ-ACK and/or SR are to be multiplexed with CSI reporting. In the figure, HARQ-ACK feedback and/or SR and the first CSI part may be jointly encoded with a first coding scheme and the second CSI part is encoded with a second coding scheme. Note that the first coding scheme and the second coding scheme may be same or distinct depending on the payload size.

In another embodiment, HARQ-ACK feedback and/or SR may be jointly encoded with the symbols of the second CSI part. Given that the payload size of the second CSI part may be determined based on the content of the first CSI part, the payload size of a concatenation of encoded bits of the HARQ-ACK feedback and/or SR and encoded bits the second CSI part may be determined accordingly. Similarly, the resource mapping schemes as mentioned above for short and long PUCCH may be applied for this option.

As a further embodiment, whether to perform joint coding for HARQ-ACK and/or SR with the first CSI part or with the second CSI part may be configured by higher layers via NR minimum system information (MSI), NR remaining minimum system information (RMSI), NR system information block (SIB) or radio resource control (RRC) signaling.

According to another embodiment, separate coding and resource mapping schemes may be applied for: 1) HARQ-ACK feedback and/or SR, 2) the first CSI part, and/or 3) the second CSI part. The resource mapping schemes as mentioned above for short and long PUCCH may be extended for this option.

Figure 9:
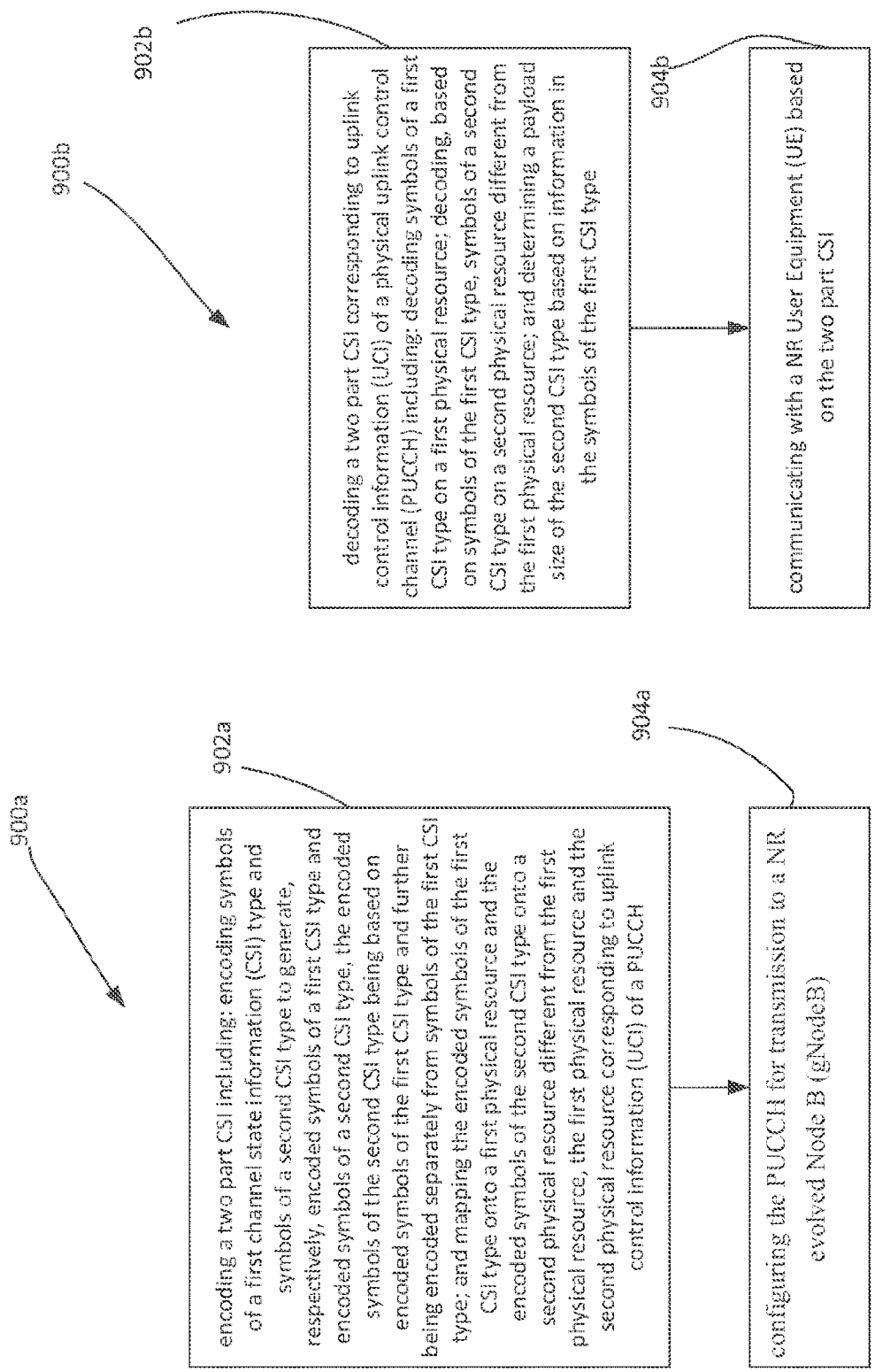
FIGS. 9A and 9B depict two respective method embodiments.

FIGS. 9A and 9B include respective methods 900a and 900b according to some demonstrative embodiments.

According to method 900a of FIG. 9A, a first method embodiment includes, at operation 902a, encoding a two part CSI including: encoding information bits of a first channel state information (CSI) type and information bits of a second CSI part to generate, respectively, encoded bits of a first CSI part and encoded bits of a second CSI part, a payload size of the second CSI part being based on encoded bits of the first CSI part and further being encoded separately from information bits of the first CSI part; and mapping the encoded bits of the first CSI part onto a first physical resource and the encoded bits of the second CSI part onto a second physical resource different from the first physical resource. At operation 904a, the method 900a includes configuring the two part CSI in a long or short PUCCH for transmission to a NR evolved Node B (gNodeB).

According to method 900a of FIG. 9A, a first method embodiment includes, at operation 902b, decoding a two part CSI that is part of a physical uplink control channel (PUCCH), decoding including: decoding symbols of a first CSI part on a first physical resource; and decoding, based on symbols of the first CSI part, symbols of a second CSI part on a second physical resource different from the first physical resource. Operation 902b further includes determining a payload size of the second CSI part based on information in the symbols of the first CSI part. At operation 904b, the method 900b includes communicating with a NR User Equipment (UE) based on the two part CSI.

Example networks and architectures that may be used to implement some demonstrative embodiments will now be shown and described with respect to FIGS. 10-16 below.

Figure 10:
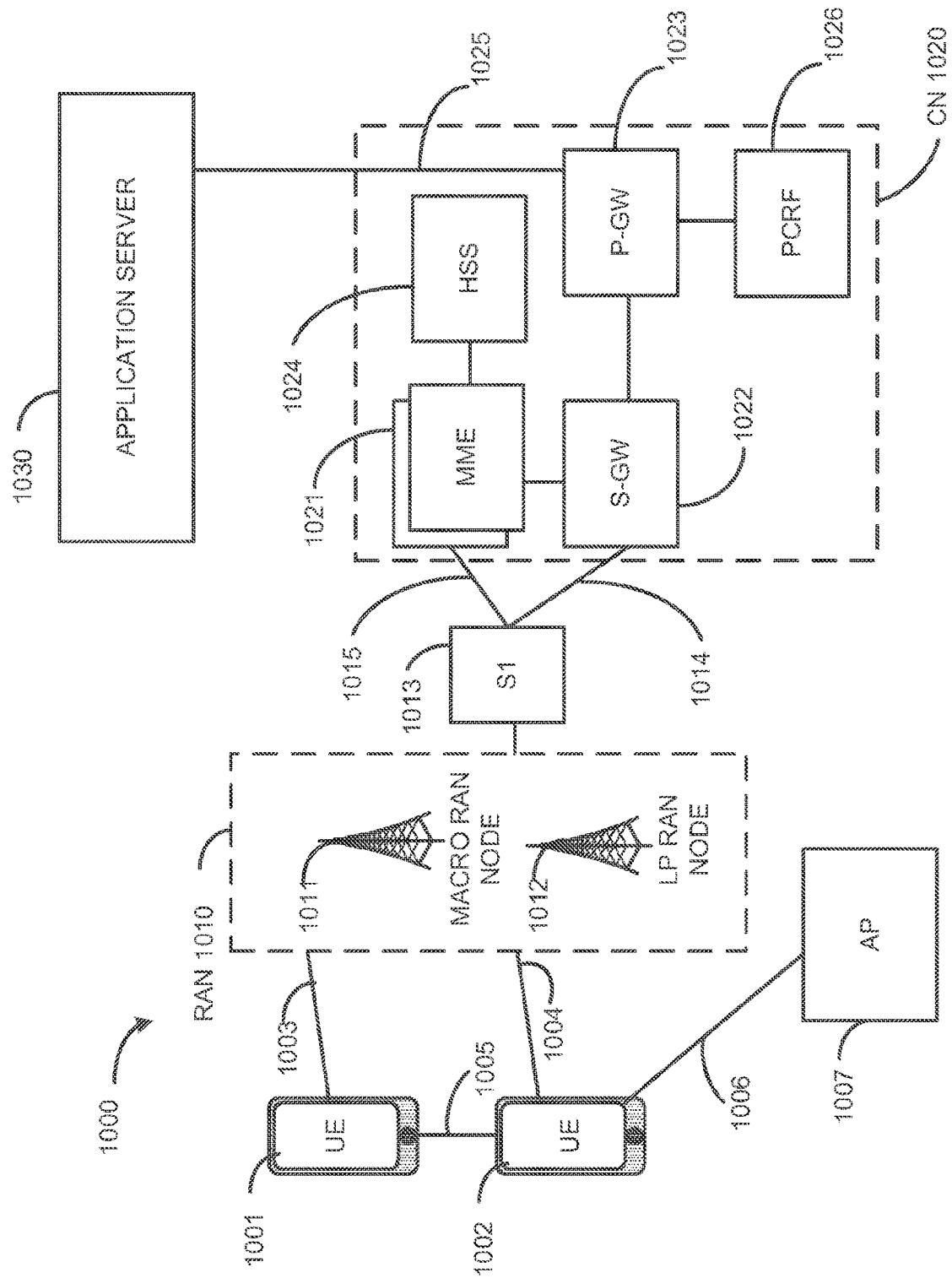
FIG. 10 depicts an architecture of a system of a network in accordance with some embodiments.

FIG. 10 illustrates an architecture of a system 1000 of a network in accordance with some embodiments. The system 1000 is shown to include a user equipment (UE) 1001 and a UE 1002. The UEs 1001 and 1002 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1001 and 1002 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1001 and 1002 may be configured to connect, e.g., communicatively couple, with a radio access network (RAN) 1010—the RAN 1010 may be, for example, an Evolved Universal Mobile Telecommunications System (UMTS) Terrestrial Radio Access Network (E-UTRAN), a NextGen RAN (NG RAN), or some other type of RAN. The UEs 1001 and 1002 utilize connections 1003 and 1004, respectively, each of which comprises a physical communications interface or layer (discussed in further detail below); in this example, the connections 1003 and 1004 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1001 and 1002 may further directly exchange communication data via a Prose interface 1005. The Prose interface 1005 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1002 is shown to be configured to access an access point (AP) 1006 via connection 1007. The connection 1007 can comprise a local wireless connection, such as a connection consistent with any IEEE 802.11 protocol, wherein the AP 1006 would comprise a wireless fidelity (Wi-Fi®) router. In this example, the AP 1006 is shown to be connected to the Internet without connecting to the core network of the wireless system (described in further detail below).

The RAN 1010 can include one or more access nodes that enable the connections 1003 and 1004. These access nodes (ANs) can be referred to as base stations (BSs), NodeBs, evolved NodeBs (eNBs), next Generation NodeBs (gNodeB), RAN nodes, and so forth, and can comprise ground stations (e.g., terrestrial access points) or satellite stations providing coverage within a geographic area (e.g., a cell). The RAN 1010 may include one or more RAN nodes for providing macrocells, e.g., macro RAN node 1011, and one or more RAN nodes for providing femtocells or picocells (e.g., cells having smaller coverage areas, smaller user capacity, or higher bandwidth compared to macrocells), e.g., low power (LP) RAN node 1012.

Any of the RAN nodes 1011 and 1012 can terminate the air interface protocol and can be the first point of contact for the UEs 1001 and 1002. In some embodiments, any of the RAN nodes 1011 and 1012 can fulfill various logical functions for the RAN 1010 including, but not limited to, radio network controller (RNC) functions such as radio bearer management, uplink and downlink dynamic radio resource management and data packet scheduling, and mobility management.

In accordance with some embodiments, the UEs 1001 and 1002 can be configured to communicate using Orthogonal Frequency-Division Multiplexing (OFDM) communication signals with each other or with any of the RAN nodes 1011 and 1012 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and Prose or sidelink communications), although the scope of the embodiments is not limited in this respect. The OFOM signals can comprise a plurality of orthogonal subcarriers.

In some embodiments, a downlink resource grid can be used for downlink transmissions from any of the RAN nodes 1011 and 1012 to the UEs 1001 and 1002, while uplink transmissions can utilize similar techniques. The grid can be a time-frequency grid, called a resource grid or time-frequency resource grid, which is the physical resource in the downlink in each slot. Such a time-frequency plane representation is a common practice for OFOM systems, which makes it intuitive for radio resource allocation. Each column and each row of the resource grid corresponds to one OFOM symbol and one OFOM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (POSCH) may carry user data and higher-layer signaling to the UEs 1001 and 1002. The physical downlink control channel (POCCH) may carry information about the transport format and resource allocations related to the POSCH channel, among other things. It may also inform the UEs 1001 and 1002 about the transport format, resource allocation, and H-ARQ (Hybrid Automatic Repeat Request) information related to the uplink shared channel. Typically, downlink scheduling (assigning control and shared channel resource blocks to the UE 1002 within a cell) may be performed at any of the RAN nodes 1011 and 1012 based on channel quality information fed back from any of the UEs 1001 and 1002. The downlink resource assignment information may be sent on the POCCH used for (e.g., assigned to) each of the UEs 1001 and 1002.

The POCCH may use control channel elements (CCEs) to convey the control information. Before being mapped to resource elements, the POCCH complex-valued symbols may first be organized into quadruplets, which may then be permuted using a sub-block interleaver for rate matching. Each POCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=I, 2, 4, or 8).

Some embodiments may use concepts for resource allocation for control channel information that are an extension of the above-described concepts. For example, some embodiments may utilize an enhanced physical downlink control channel (EPDCCH) that uses POSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1010 is shown to be communicatively coupled to a core network (CN) 1020—via an SI interface 1013. In embodiments, the CN 1020 may be an evolved packet core (EPC) network, a NextGen Packet Core (NPC) network, or some other type of CN. In this embodiment the SI interface 1013 is split into two parts: the SI-U interface 1014, which carries traffic data between the RAN nodes 1011 and 1012 and the serving gateway (S-GW) 1022, and the SI-mobility management entity (MME) interface 1015, which is a signaling interface between the RAN nodes 1011 and 1012 and MMEs 1021.

In this embodiment, the CN 1020 comprises the MMEs 1021, the S-GW 1022, the Packet Data Network (PDN) Gateway (P-GW) 1023, and a home subscriber server (HSS) 1024. The MMEs 1021 may be similar in function to the control plane of legacy Serving General Packet Radio Service (GPRS) Support Nodes (SGSN). The MMEs 1021 may manage mobility aspects in access such as gateway selection and tracking area list management. The HSS 1024 may comprise a database for network users, including subscription-related information to support the network entities' handling of communication sessions. The CN 1020 may comprise one or several HSSs 1024, depending on the number of mobile subscribers, on the capacity of the equipment, on the organization of the network, etc. For example, the HSS 1024 can provide support for routing/roaming, authentication, authorization, naming/addressing resolution, location dependencies, etc.

The S-GW 1022 may terminate the SI interface 1013 towards the RAN 1010, and routes data packets between the RAN 1010 and the CN 1020. In addition, the S-GW 1022 may be a local mobility anchor point for inter-RAN node handovers and also may provide an anchor for inter-3GPP mobility. Other responsibilities may include lawful intercept, charging, and some policy enforcement.

The P-GW 1023 may terminate an SGi interface toward a PDN. The P-GW 1023 may route data packets between the EPC network 1023 and external networks such as a network including the application server 1030 (alternatively referred to as application function (AF)) via an Internet Protocol (IP) interface 1025. Generally, the application server 1030 may be an element offering applications that use IP bearer resources with the core network (e.g., UMTS Packet Services (PS) domain, LTE PS data services, etc.). In this embodiment, the P-GW 1023 is shown to be communicatively coupled to an application server 1030 via an IP communications interface 1025. The application server 1030 can also be configured to support one or more communication services (e.g., Voice-over-Internet Protocol (VoIP) sessions, PTT sessions, group communication sessions, social networking services, etc.) for the UEs 1001 and 1002 via the CN 1020.

The P-GW 1023 may further be a node for policy enforcement and charging data collection. Policy and Charging Enforcement Function (PCRF) 1026 is the policy and charging control element of the CN 1020. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1023. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

Figure 11:
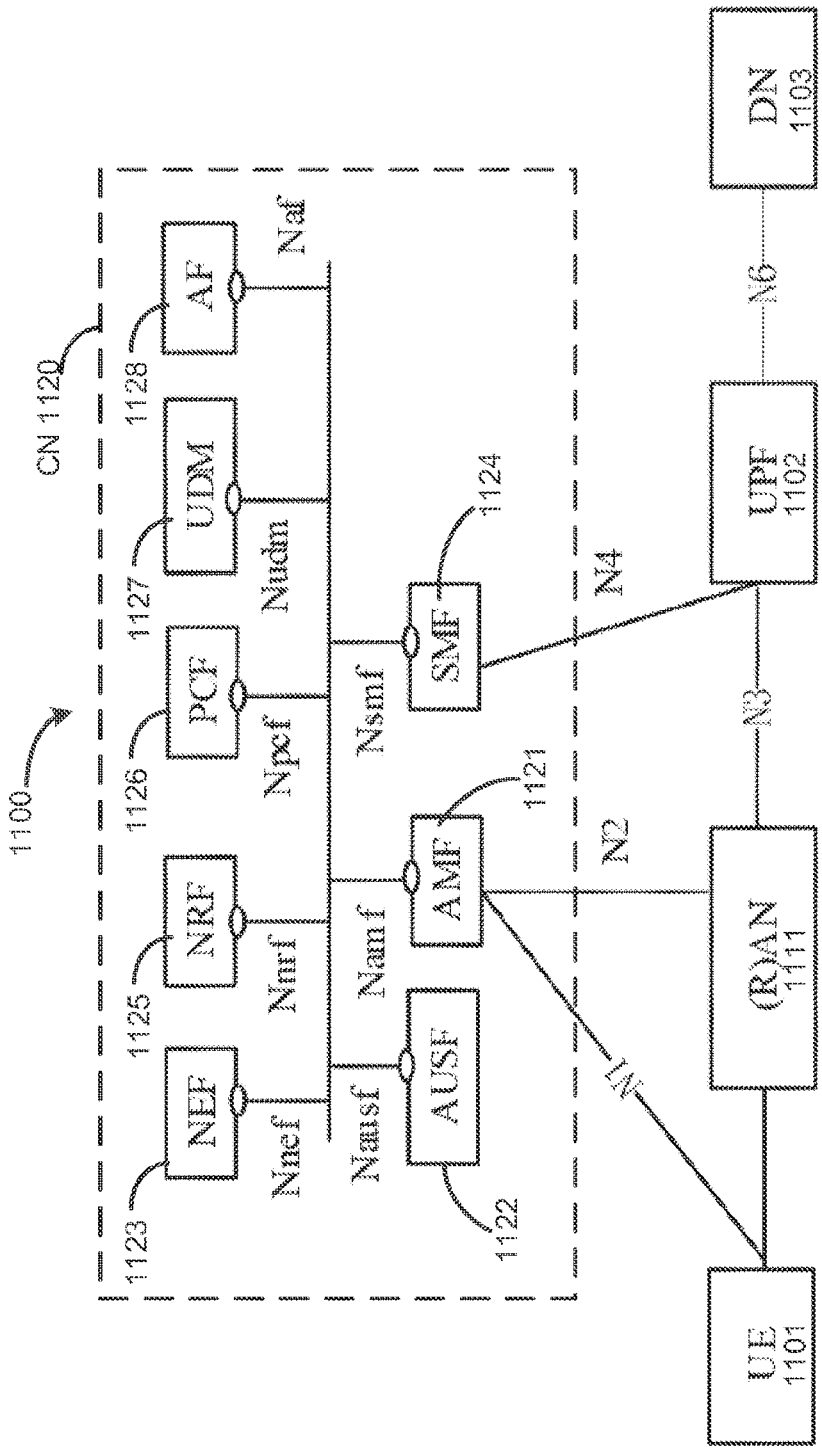
FIG. 11 depicts an architecture of a system of a network in accordance with one embodiment.

FIG. 11 illustrates an architecture of a system 1100 of a network in accordance with some embodiments. The system 1100 is shown to include a UE 1101, which may be the same or similar to UEs 1001 and 1002 discussed previously; a RAN node 1111, which may be the same or similar to RAN nodes 1011 and 1012 discussed previously; a User Plane Function (UPF) 1102; a Data network (DN) 1103, which may be, for example, operator services, Internet access or 3rd party services; and a SG Core Network (SGC or CN) 1120.

The CN 1120 may include an Authentication Server Function (AUSF) 1122; a Core Access and Mobility Management Function (AMF) 1121; a Session Management Function (SMF) 1124; a Network Exposure Function (NEF) 1123; a Policy Control function (PCF) 1126; a Network Function (NF) Repository Function (NRF) 1125; a Unified Data Management (UDM) 1127; and an Application Function (AF) 1128. The CN 1120 may also include other elements that are not shown, such as a Structured Data Storage network function (SDSF), an Unstructured Data Storage network function (UDSF), and the like.

The UPF 1102 may act as an anchor point for intra-RAT and inter-RAT mobility, an external PDU session point of interconnect to DN 1103, and a branching point to support multi-homed PDU session. The UPF 1102 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 1102 may include an uplink classifier to support routing traffic flows to a data network. The DN 1103 may represent various network operator services, Internet access, or third party services. NY 1103 may include, or be similar to application server 1030 discussed previously.

The AUSF 1122 may store data for authentication of UE 1101 and handle authentication related functionality. The AUSF 1122 may facilitate a common authentication framework for various access types.

The AMF 1121 may be responsible for registration management (e.g., for registering UE 1101, etc.), connection management, reachability management, mobility management, and lawful interception of AMF-related events, and access authentication and authorization. AMF 1121 may provide transport for SM messages between and SMF 1124, and act as a transparent proxy for routing SM messages. AMF 1121 may also provide transport for short message service (SMS) messages between UE 1101 and an SMS function (SMSF) (not shown by FIG. 11). AMF 1121 may act as Security Anchor Function (SEA), which may include interaction with the AUSF 1122 and the UE 1101, receipt of an intermediate key that was established as a result of the UE 1101 authentication process. Where USIM based authentication is used, the AMF 1121 may retrieve the security material from the AUSF 1122. AMF 1121 may also include a Security Context Management (SCM) function, which receives a key from the SEA that it uses to derive access-network specific keys. Furthermore, AMF 1121 may be a termination point of RAN CP interface (N2 reference point), a termination point of NAS (NI) signaling, and perform NAS ciphering and integrity protection.

AMF 1121 may also support NAS signaling with a UE 1101 over an N3 interworking-function (IWF) interface. The N3IWF may be used to provide access to untrusted entities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (NI) signaling between the UE 1101 and AMF 1121, and relay uplink and downlink user-plane packets between the UE 1101 and UPF 1102. The N3IWF also provides mechanisms for IPsec tunnel establishment with the UE 1101.

The SMF 1124 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 1124 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 1123 may provide means for securely exposing the services and capabilities provided by 3GPP network functions for third party, internal exposure/re-exposure, Application Functions (e.g., AF 1128), edge computing or fog computing systems, etc. In such embodiments, the NEF 1123 may authenticate, authorize, and/or throttle the AFs. NEF 1123 may also translate information exchanged with the AF 1128 and information exchanged with internal network functions. For example, the NEF 1123 may translate between an AF-Service-Identifier and an internal 5CC information. NEF 1123 may also receive information from other network functions (NFs) based on exposed capabilities of other network functions. This information may be stored at the NEF 1123 as structured data, or at a data storage NF using a standardized interfaces. The stored information can then be re-exposed by the NEF 1123 to other NFs and AFs, and/or used for other purposes such as analytics.

The NRF 1125 may support service discovery functions, receive NF Discovery Requests from NF instances, and provide the information of the discovered NF instances to the NF instances. NRF 1125 also maintains information of available NF instances and their supported services.

The PCF 1126 may provide policy rules to control plane function(s) to enforce them, and may also support unified policy framework to govern network behavior. The PCF 1126 may also implement a front end (FE) to access subscription information relevant for policy decisions in a UDR of UDM 1127.

The UDM 1127 may handle subscription-related information to support the network entities' handling of communication sessions, and may store subscription data of UE 1101. The UDM 1127 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 1126. UDM 1127 may also support SMS management, wherein an SMS-FE implements the similar application logic as discussed previously.

The AF 1128 may provide application influence on traffic routing, access to the Network Capability Exposure (NCE), and interact with the policy framework for policy control. The NCE may be a mechanism that allows the SGC and AF 1128 to provide information to each other via NEF 1123, which may be used for edge computing implementations. In such implementations, the network operator and third party services may be hosted close to the UE 1101 access point of attachment to achieve an efficient service delivery through the reduced end-to-end latency and load on the transport network. For edge computing implementations, the SGC may select a UPF 1102 close to the UE 1101 and execute traffic steering from the UPF 1102 to DN 1103 via the N6 interface. This may be based on the UE subscription data, UE location, and information provided by the AF 1128. In this way, the AF 1128 may influence UPF (re)selection and traffic routing. Based on operator deployment, when AF 1128 is considered to be a trusted entity, the network operator may permit AF 1128 to interact directly with relevant NFs.

As discussed previously, the CN 1120 may include an SMSF, which may be responsible for SMS subscription checking and verification, and relaying SM messages to/from the UE 1101 to/from other entities, such as an SMS-GMSC/IWMSC/SMS-router. The SMS may also interact with AMF 1121 and UDM 1127 for notification procedure that the UE 1101 is available for SMS transfer (e.g., set a UE not reachable flag, and notifying UDM 1127 when UE 1101 is available for SMS).

The system 1100 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 1100 may include the following reference points: NI: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an NI I reference point between the AMF and SMF; etc. In some embodiments, the CN 1120 may include an Nx interface, which is an inter-CN interface between the MME (e.g., MME 102 I) and the AMF 112 I in order to enable interworking between CN 1120 and CN 1020.

Although not shown by FIG. 11, system 1100 may include multiple RAN nodes 1111 wherein an Xn interface is defined between two or more RAN nodes 1111 (e.g., gNodeBs and the like) that connecting to SGC 1120, between a RAN node 1111 (e.g., gNodeB) connecting to SGC 1120 and an eNB (e.g., a RAN node 1011 of FIG. 10), and/or between two eNBs connecting to SGC 1120.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1101 in a connected mode (e.g., CM-CONNECTED) including functionality to manage the UE mobility for connected mode between one or more RAN nodes 1111. The mobility support may include context transfer from an old (source) serving RAN node 1111 to new (target) serving RAN node 1111; and control of user plane tunnels between old (source) serving RAN node 1111 to new (target) serving RAN node 1111.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 12:
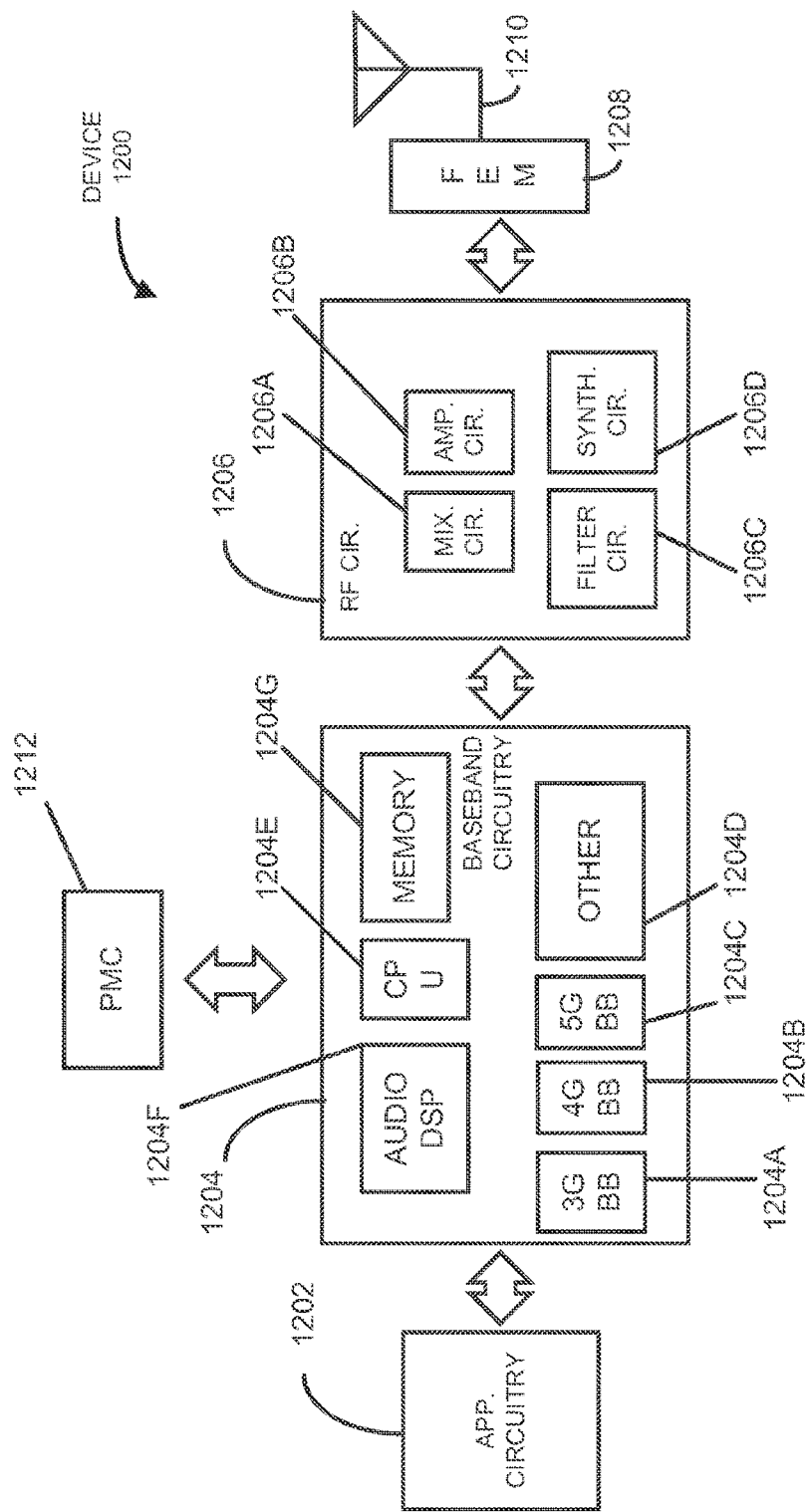
FIG. 12 depicts example components of a device in accordance with some embodiments.

FIG. 12 illustrates example components of a device 1200 in accordance with some embodiments. In some embodiments, the device 1200 may include application processing circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application processing circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application processing circuitry 1202 may include one or more application processors. For example, the application processing circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application processing circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuity 1204 may interface with the application processing circuitry 1202 for generation and processing of the baseband signals and for controlling operations of the RF circuitry 1206. For example, in some embodiments, the baseband circuitry 1204 may include one or more processors including a third generation {3G} baseband processing circuitry 1204A, a fourth generation (4G) baseband processing circuitry 1204B, a fifth generation (SG) baseband processing circuitry 1204C, or other baseband processing circuitry(s) 1204D for other existing generations, generations in development or to be developed in the future (e.g., second generation (2G), sixth generation {6G), etc.). The baseband circuitry 1204 (e.g., one or more of baseband processing circuitries 1204A-D) may handle various radio control functions that enable communication with one or more radio networks via the RF circuitry 1206. In other embodiments, some or all of the functionality of baseband processing circuitry 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. The FFT may be provided by way of one or more memories coupled to the modulation/demodulation circuitry of the baseband circuitry, such as one or more random access memories to allow the performance of butterfly operations. In some embodiments, encoding/decoding circuitry of the baseband circuitry 1204 may include convolution, tail-biting convolution, turbo, Viterbi, or Low-Density Parity Check (LDPC) encoder/decoder functionality. Embodiments of modulation/demodulation and encoder/decoder functionality a re not limited to these examples and may include other suitable functionality in other embodiments.

In some embodiments, the baseband circuitry 1204 may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application processing circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206a of the receive signal path may comprise passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c.

In some embodiments, the mixer circuitry 1206a of the receive signal path and the mixer circuitry 1206a of the transmit signal path may include two or more mixers and may be arranged for quadrature down conversion and up conversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206a may be arranged for direct down conversion and direct up conversion, respectively. In some embodiments, the mixer circuitry 1206a of the receive signal path and the mixer circuitry 1206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206d may be a fractional-N synthesizer or a fractional N/N+1 synthesizer, although the scope of the embodiments is not limited in this respect as other types of frequency synthesizers may be suitable. For example, synthesizer circuitry 1206d may be a delta-sigma synthesizer, a frequency multiplier, or a synthesizer comprising a phase-locked loop with a frequency divider.

The synthesizer circuitry 1206d may be configured to synthesize an output frequency for use by the mixer circuitry 1206a of the RF circuitry 1206 based on a frequency input and a divider control input. In some embodiments, the synthesizer circuitry 1206d may be a fractional N/N+1 synthesizer.

In some embodiments, frequency input may be provided by a voltage-controlled oscillator (VCO), although that is not a requirement. Divider control input may be provided by either the baseband circuitry 1204 or the application processing circuitry 1202 depending on the desired output frequency. In some embodiments, a divider control input (e.g., N) may be determined from a look-up table based on a channel indicated by the application processing circuitry 1202.

Synthesizer circuitry 1206d of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. However, in other embodiments, the PMC 1212 may be additionally or alternatively coupled with, and perform similar power management operations for, other components such as, but not limited to, application processing circuitry 1202, RF circuitry 1206, or FEM 1208.

In some embodiments, the PMC 1212 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application processing circuitry 1202 and processors of the baseband circuitry 1204 may be used to execute elements of one or more instances of a protocol stack. For example, processors of the baseband circuitry 1204, alone or in combination, may be used to execute Layer 3, Layer 2, or Layer 1 functionality, while processors of the application circuitry 1202 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 13:
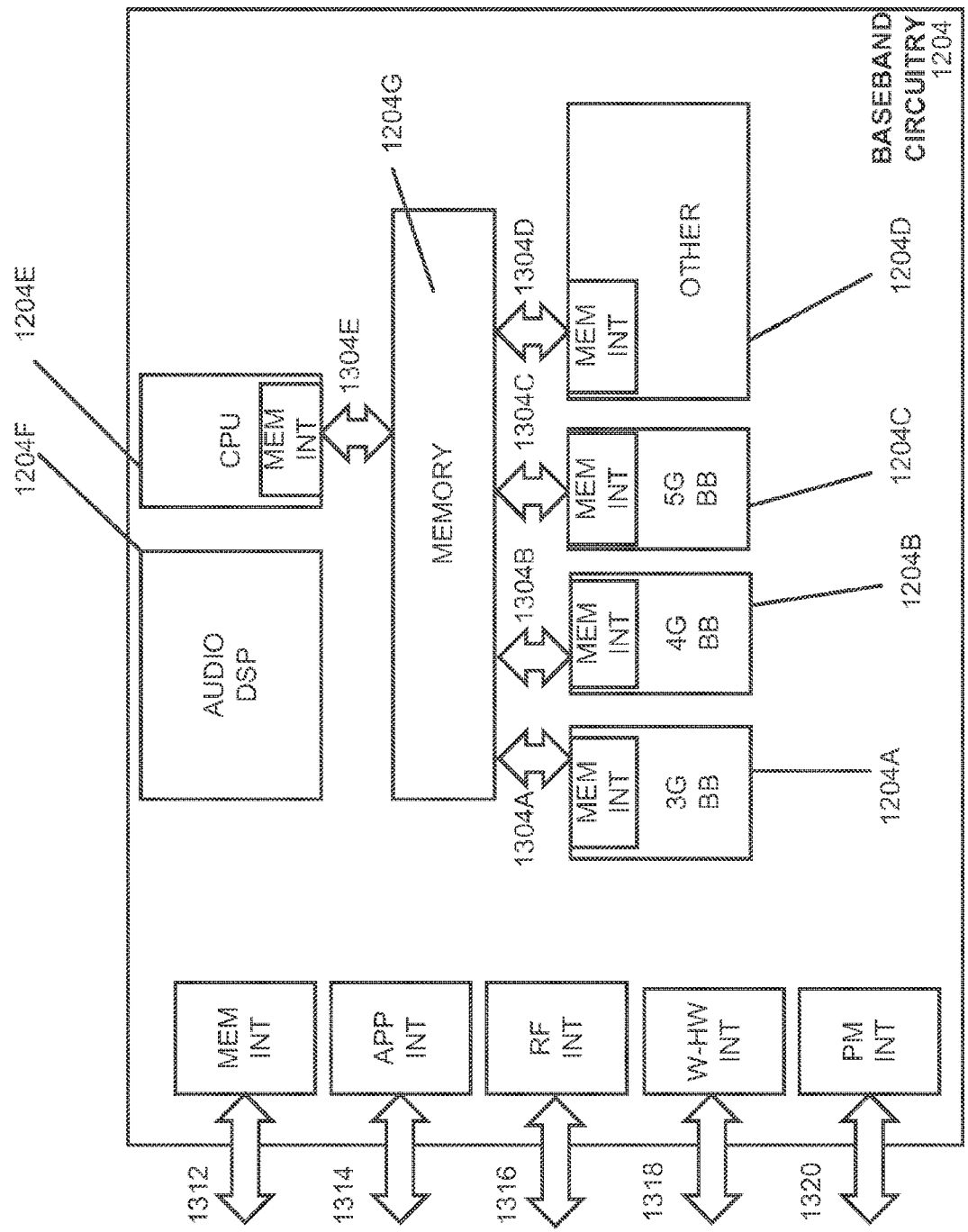
FIG. 13 depicts example interfaces of a baseband circuitry in accordance with some embodiments.

FIG. 13 illustrates example interfaces of baseband circuitry in accordance with some embodiments. As discussed above, the baseband circuitry 1204 of FIG. 12 may comprise processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application processing circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212.

Figure 14:
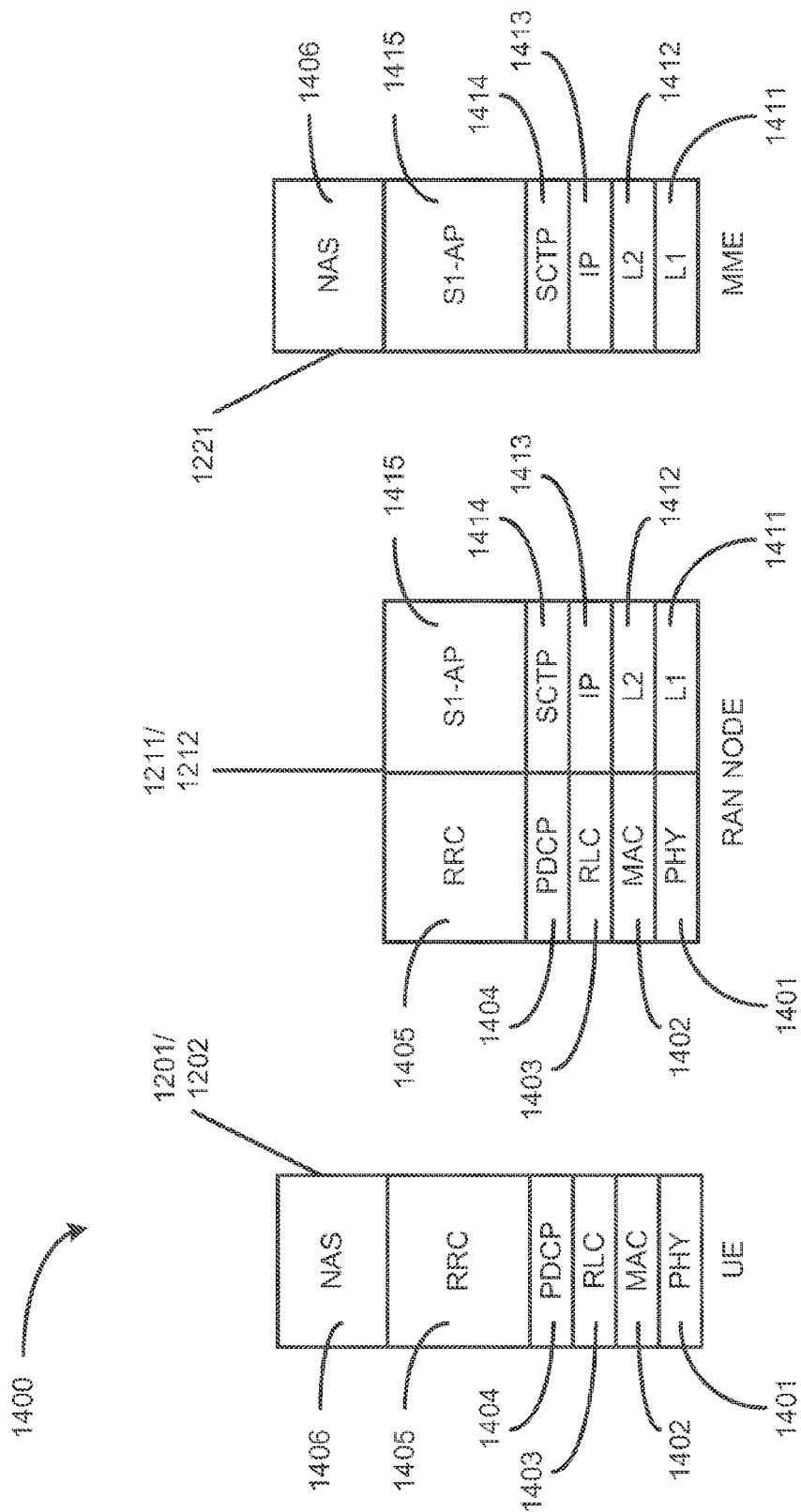
FIG. 14 depicts a control plane protocol stack in accordance with some embodiments.

FIG. 14 is an illustration of a control plane protocol stack in accordance with some embodiments. In this embodiment, a control plane 1400 is shown as a communications protocol stack between the UE 1001 (or alternatively, the UE 1002), the RAN node 1011 (or alternatively, the RAN node 1012), and the MME 1021.

The PHY layer 1401 may transmit or receive information used by the MAC layer 1402 over one or more air interfaces. The PHY layer 1401 may further perform link adaptation or adaptive modulation and coding (AMC), power control, cell search (e.g., for initial synchronization and handover purposes), and other measurements used by higher layers, such as the RRC layer 1405. The PHY layer 1401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 1403 may operate in a plurality of modes of operation, including: Transparent Mode (TM), Unacknowledged Mode (UM), and Acknowledged Mode (AM). The RLC layer 1403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 1001 and the RAN node 1011 may utilize a Uu interface (e.g., an LTE-Uu interface) to exchange control plane data via a protocol stack comprising the PHY layer 1401, the MAC layer 1402, the RLC layer 1403, the PDCP layer 1404, and the RRC layer 1405.

The non-access stratum (NAS) protocols 1406 form the highest stratum of the control plane between the UE 1001 and the MME 1021. The NAS protocols 1406 support the mobility of the UE 1001 and the session management procedures to establish and maintain IP connectivity between the UE 1001 and the P-GW 1023.

The SI Application Protocol (SI-AP) layer 1415 may support the functions of the SI interface and comprise Elementary Procedures (EPs). An EP is a unit of interaction between the RAN node 1011 and the ON 1020. The SI-AP layer services may comprise two groups: UE-associated services and non-UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1414 may ensure reliable delivery of signaling messages between the RAN node 1011 and the MME 1021 based, in part, on the IP protocol, supported by the IP layer 1413. The L2 layer 1412 and the LI layer 1411 may refer to communication links (e.g., wired or wireless) used by the RAN node and the MME to exchange information.

The RAN node 1011 and the MME 1021 may utilize an SI-MME interface to exchange control plane data via a protocol stack comprising the LI layer 1411, the L2 layer 1412, the IP layer 1413, the SCTP layer 1414, and the SI-AP layer 1415.

Figure 15:
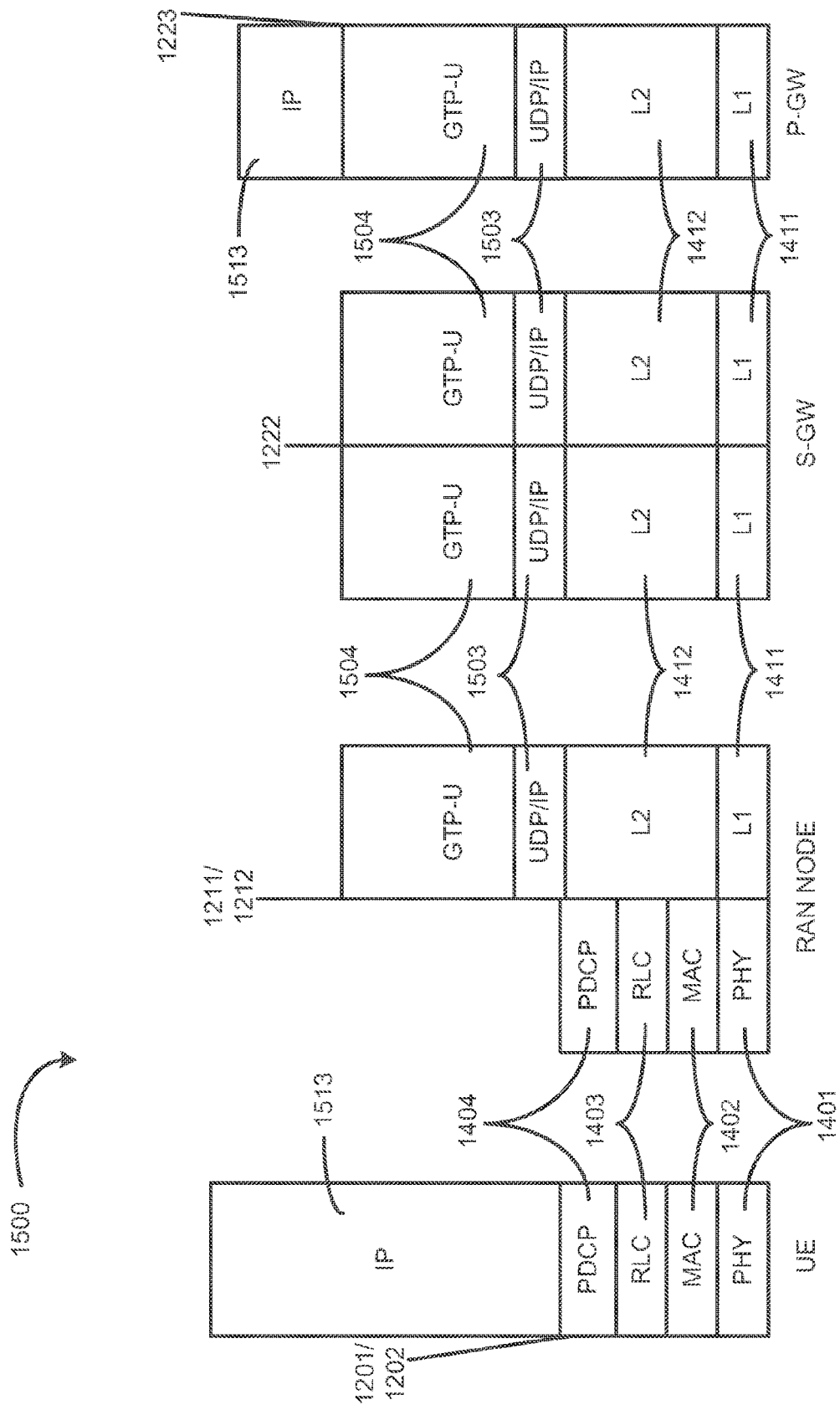
FIG. 15 depicts a user plane protocol stack in accordance with some embodiments.

FIG. 15 is an illustration of a user plane protocol stack in accordance with some embodiments. In this embodiment, a user plane 1500 is shown as a communications protocol stack between the UE 1001 (or alternatively, the UE 1002), the RAN node 1011 (or alternatively, the RAN node 1012), the S-GW 1022, and the P-GW 1023. The user plane 1500 may utilize at least some of the same protocol layers as the control plane 1400. For example, the UE 1001 and the RAN node 1011 may utilize a Uu interface (e.g., an LTE-Uu interface) to exchange user plane data via a protocol stack comprising the PHY layer 1401, the MAC layer 1402, the RLC layer 1403, the PDCP layer 1404.

The General Packet Radio Service (GPRS) Tunneling Protocol for the user plane (GTP-U) layer 1504 may be used for carrying user data within the GPRS core network and between the radio access network and the core network. The user data transported can be packets in any of IPv4, IPv6, or PPP formats, for example. The UDP and IP security (UDP/IP) layer 1503 may provide checksums for data integrity, port numbers for addressing different functions at the source and destination, and encryption and authentication on the selected data flows. The RAN node 1011 and the S-GW 1022 may utilize an SI-U interface to exchange user plane data via a protocol stack comprising the LI layer 1411, the L2 layer 1412, the UDP/IP layer 1503, and the GTP-U layer 1504. The S-GW 1022 and the P-GW 1023 may utilize an S5/S8a interface to exchange user plane data via a protocol stack comprising the LI layer 1411, the L2 layer 1412, the UDP/IP layer 1503, and the GTP-U layer 1504. As discussed above with respect to FIG. 14, NAS protocols support the mobility of the UE 1001 and the session management procedures to establish and maintain IP connectivity between the UE 1001 and the P-GW 1023.

Figure 16:
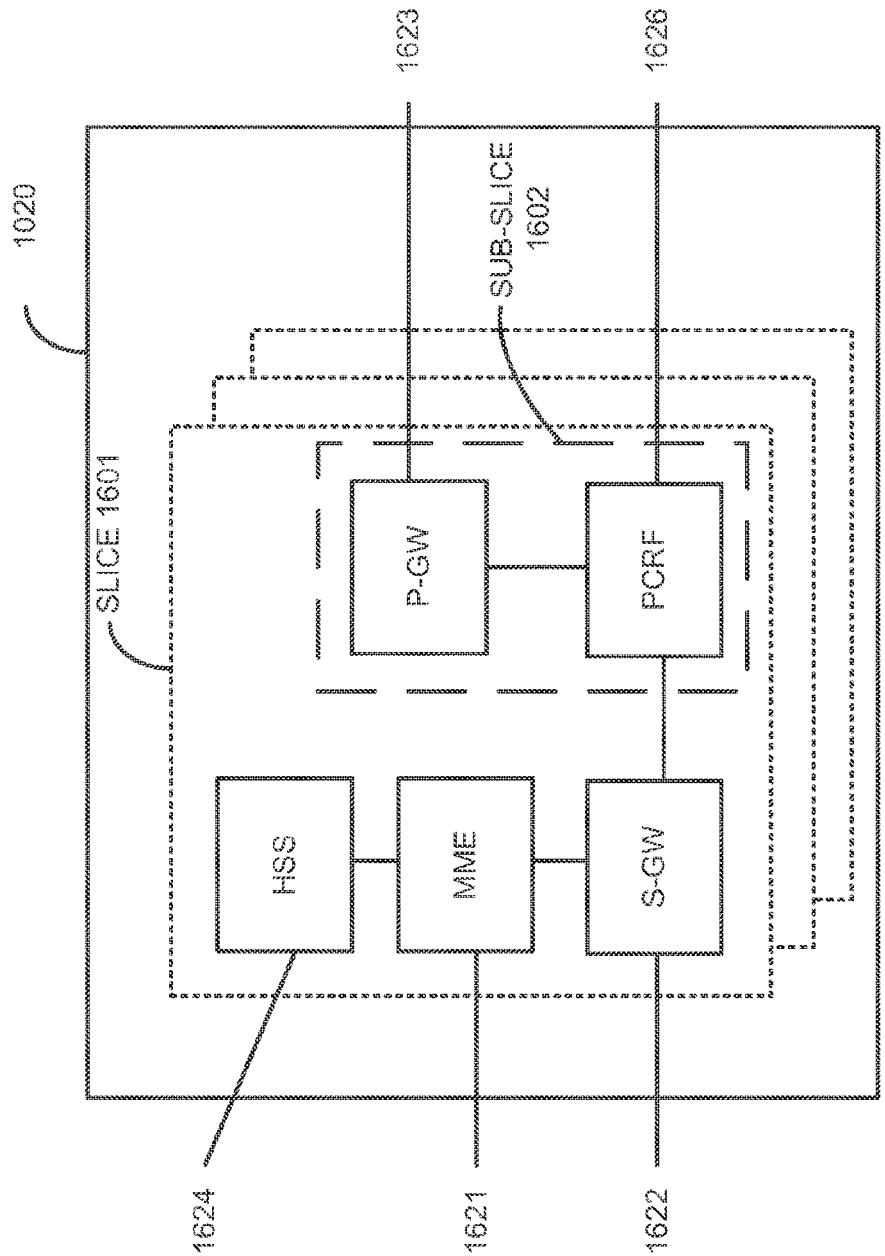
FIG. 16 illustrates components of a core network in accordance with some embodiments.

FIG. 16 illustrates components of a core network in accordance with some embodiments. The components of the CN 1020 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 1020 may be referred to as a network slice 1601. A logical instantiation of a portion of the CN 1020 may be referred to as a network sub-slice 1602 (e.g., the network sub-slice 1602 is shown to include the PGW 1023 and the PCRF 1026).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

In some embodiments, the electronic device(s), network(s), system(s), chip(s) or component(s), or portions or implementations thereof, of any of the Figures shown and described herein may be configured to perform one or more processes, techniques, or methods as described herein, or portions thereof.

In some embodiments, the electronic device(s), network(s), system(s), chip(s) or component(s), or portions or implementations thereof, of FIGS. 10-16, or some other figure herein may be configured to perform one or more processes, techniques, or methods as described herein in relation to embodiments, or portions thereof.

EXAMPLES

Example 1 includes a device of a New Radio (NR) User Equipment, the device including a radio frequency (RF) interface, and one or more processors coupled to the RF interface and configured to: encode a two part CSI including: encoding information bits of a first channel state information (CSI) type and information bits of a second CSI part to generate, respectively, encoded bits of a first CSI part and encoded bits of a second CSI part, a payload size of the second CSI part being based on encoded bits of the first CSI part and further being encoded separately from information bits of the first CSI part; and mapping the encoded bits of the first CSI part onto a first physical resource and the encoded bits of the second CSI part onto a second physical resource different from the first physical resource; and configure the two part CSI in a long or short PUCCH for transmission to a NR evolved Node B (gNodeB).

Example 2 includes the subject matter of Example 1, and optionally, wherein the first physical resource and the second physical resource are based on a ratio between an amount of resources for the first CSI part and an amount of overall resources for all CSI reports on the PUCCH.

Example 3 includes the subject matter of Example 1, and optionally, the one or more processors further to: encode information bits of a hybrid automatic repeat request (HARQ) acknowledgment (ACK) (HARQ-ACK) feedback and of a scheduling request (SR) jointly to generate, respectively, encoded HARQ-ACK bits and encoded SR bits; and map the encoded HARQ-ACK bits and SR bits to the first physical resource.

Example 4 includes the subject matter of Example 3, and optionally, wherein the one or more processors is further to jointly encode information bits of the HARQ-ACK feedback and information bits of the SR with information bits of the first CSI part.

Example 5 includes the subject matter of Example 4, and optionally, wherein at least one of the first CSI part, the HARQ-ACK feedback and the SR has a predetermined payload size, the one or more processors to further encode a corresponding one of the information bits of the first CSI part, of the HARQ-ACK feedback and of the SR with zero padding based on the predetermined payload size.

Example 6 includes the subject matter of any one of Examples 3-5, and optionally, wherein the one or more processors is to map the encoded HARQ-ACK feedback bits, the encoded SR bits and the encoded bits of the first CSI part in a same resource.

Example 7 includes the subject matter of any one of Examples 1-5, and optionally, wherein one or more processors further configured to determine a payload size of the second CSI part based on a payload size of the first CSI part.

Example 8 includes the subject matter of any one of Examples 1-4, and optionally, wherein one or more processors further configured to: decode higher layer signaling from the gNodeB; and configure at least one of a payload size of a first physical resource and a second physical resource based on the higher layer signaling.

Example 9 includes the subject matter of Example 8, and optionally, wherein the one or more processors is to configure the size of second physical resource based on the first physical resource.

Example 10 includes the subject matter of Example 8, and optionally, wherein the higher layer signaling includes NR minimum system information (MSI), NR remaining minimum system information (RMSI), NR system information block (SIB), or radio resource control (RRC) signaling.

Example 11 includes the subject matter of Example 8, and optionally, wherein the higher layer signaling includes UE-specific signaling.

Example 12 includes the subject matter of any one of Examples 1-5, and optionally, wherein the first physical resource and the second physical resource are multiplexed in a time division multiplexing (TDM) manner or in a frequency divisional multiplexing (FDM) manner or according to a combination of TDM and FDM.

Example 13 includes the subject matter of Example 12, and optionally, wherein the first physical resource and the second physical resource are multiplexed in a time division multiplexing (TDM) manner, and wherein the first physical resource is to precede the second physical resource in a time domain.

Example 14 includes the subject matter of Example 13, and optionally, wherein the first physical resource is mapped adjacent to or at each side of a physical resource carrying a demodulation reference signal (DM-RS).

Example 15 includes the subject matter of Example 14, and optionally, wherein the PUCCH includes two separate PUCCHs to carry the first CSI part and the second CSI part respectively, the two PUCCHs multiplexed in a time division multiplexing (TDM) manner in different symbols within one slot.

Example 16 includes the subject matter of any one of Examples 1-5, and optionally, wherein: the first CSI part includes rank indicator (RI), CSI resource indicator (CRI) and precoding matrix indicator (PMI), and the second CSI part includes channel quality indicator (CQI); the first CSI part includes RI and CRI, and the second CSI part includes PMI and CQI; or the first CSI part includes RI, CRI and CQI, and the second CSI part includes PMI.

Example 17 includes the subject matter of any one of Examples 1-5, and optionally, further including a front-end module (FEM) coupled to the RF interface.

Example 18 includes the subject matter of Example 16, and optionally, further including at least one antenna coupled to the FEM.

Example 19 includes a method to be performed at a New Radio (NR) User Equipment, the method including: encoding a two part CSI including: encoding information bits of a first channel state information (CSI) type and information bits of a second CSI part to generate, respectively, encoded bits of a first CSI part and encoded bits of a second CSI part, a payload size of the second CSI part being based on encoded bits of the first CSI part and further being encoded separately from information bits of the first CSI part; and mapping the encoded bits of the first CSI part onto a first physical resource and the encoded bits of the second CSI part onto a second physical resource different from the first physical resource; and configuring the two part CSI in a long or short PUCCH for transmission to a NR evolved Node B (gNodeB).

Example 20 includes the subject matter of Example 19, and optionally, wherein the first physical resource and the second physical resource are based on a ratio between an amount of resources for the first CSI part and an amount of overall resources for all CSI reports on the PUCCH.

Example 21 includes the subject matter of Example 19, and optionally, the method further including: encoding information bits of a hybrid automatic repeat request (HARQ) acknowledgment (ACK) (HARQ-ACK) feedback and of a scheduling request (SR) jointly to generate, respectively, encoded HARQ-ACK bits and encoded SR bits; and mapping the encoded HARQ-ACK bits and SR bits to the first physical resource.

Example 22 includes the subject matter of Example 21, and optionally, the method further including jointly encoding information bits of the HARQ-ACK feedback and information bits of the SR with information bits of the first CSI part.

Example 23 includes the subject matter of Example 22, and optionally, wherein at least one of the first CSI part, the HARQ-ACK feedback and the SR has a predetermined payload size, the method further including encoding a corresponding one of the information bits of the first CSI part, of the HARQ-ACK feedback and of the SR with zero padding based on the predetermined payload size.

Example 24 includes the method of any one of Examples 21-23, and optionally, the method further including mapping the encoded HARQ-ACK feedback bits, the encoded SR bits and the encoded bits of the first CSI part in a same resource.

Example 25 includes the method of any one of Examples 19-23, and optionally, the method further including determining a payload size of the second CSI part based on a payload size of the first CSI part.

Example 26 includes the method of any one of Examples 19-23, and optionally, the method further including: decoding higher layer signaling from the gNodeB; and configuring at least one of the first physical resource and the second physical resource based on the higher layer signaling.

Example 27 includes the subject matter of Example 26, and optionally, the method further including configuring the second physical resource based on the first physical resource.

Example 28 includes the subject matter of Example 26, and optionally, wherein the higher layer signaling includes NR minimum system information (MSI), NR remaining minimum system information (RMSI), NR system information block (SIB), or radio resource control (RRC) signaling.

Example 29 includes the subject matter of Example 27, and optionally, wherein the higher layer signaling includes UE-specific signaling.

Example 30 includes the method of any one of Examples 19-23, and optionally, wherein the first physical resource and the second physical resource are multiplexed in a time division multiplexing (TDM) manner or in a frequency divisional multiplexing (FDM) manner or according to a combination of TDM and FDM.

Example 31 includes the subject matter of Example 30, and optionally, wherein the first physical resource and the second physical resource are multiplexed in a time division multiplexing (TDM) manner, and wherein the first physical resource is to precede the second physical resource in a time domain.

Example 32 includes the subject matter of Example 31, and optionally, wherein the first physical resource is mapped adjacent to or at each side of a physical resource carrying a demodulation reference signal (DM-RS).

Example 33 includes the subject matter of Example 32, and optionally, wherein the PUCCH includes two separate PUCCHs to carry the first CSI part and the second CSI part respectively, the two PUCCHs multiplexed in a time division multiplexing (TDM) manner in different symbols within one slot.

Example 34 includes the method of any one of Examples 19-23 wand optionally, herein: the first CSI part includes rank indicator (RI), CSI resource indicator (CRI) and precoding matrix indicator (PMI), and the second CSI part includes channel quality indicator (001); the first CSI part includes RI and CRI, and the second CSI part includes PMI and CQI; or the first CSI part includes RI, CRI and CQI, and the second CSI part includes PMI.

Example 35 includes a product comprising one or more computer-readable storage media comprising computer-executable instructions operable to, when executed by at least one computer processor, enable the at least one computer processor to implement operations at a wireless communication device, the operations comprising: encoding a two part CSI including: encoding information bits of a first channel state information (CSI) type and information bits of a second CSI part to generate, respectively, encoded bits of a first CSI part and encoded bits of a second CSI part, a payload size of the second CSI part being based on encoded bits of the first CSI part and further being encoded separately from information bits of the first CSI part; and mapping the encoded bits of the first CSI part onto a first physical resource and the encoded bits of the second CSI part onto a second physical resource different from the first physical resource; and configuring the two part CSI in a long or short PUCCH for transmission to a NR evolved Node B (gNodeB).

Example 36 includes the subject matter of Example 35, and optionally, wherein the computer-readable storage media are tangible and non-transitory.

Example 37 includes the subject matter of Example 35, and optionally, wherein the first physical resource and the second physical resource are based on a ratio between an amount of resources for the first CSI part and an amount of overall resources for all CSI reports on the PUCCH.

Example 38 includes the subject matter of Example 35, and optionally, wherein the operations further include: encoding information bits of a hybrid automatic repeat request (HARQ) acknowledgment (ACK) (HARQ-ACK) feedback and of a scheduling request (SR) jointly to generate, respectively, encoded HARQ-ACK bits and encoded SR bits; and mapping the encoded HARQ-ACK bits and SR bits to the first physical resource.

Example 39 includes the subject matter of Example 38, and optionally, the operations further including jointly encoding information bits of the HARQ-ACK feedback and information bits of the SR with information bits of the first CSI part.

Example 40 includes the subject matter of Example 38, and optionally, wherein at least one of the first CSI part, the HARQ-ACK feedback and the SR has a predetermined payload size, the operations further including encoding a corresponding one of the information bits of the first CSI part, of the HARQ-ACK feedback and of the SR with zero padding based on the predetermined payload size.

Example 41 includes the subject matter of any one of Examples 38-40, the operations further including mapping the encoded HARQ-ACK feedback bits, the encoded SR bits and the encoded bits of the first CSI part in a same resource.

Example 42 includes the subject matter of any one of Examples 35-40, the operations further including determining a payload size of the second CSI part based on a payload size of the first CSI part.

Example 43 includes the subject matter of any one of Examples 35-40, the operations further including: decoding higher layer signaling from the gNodeB; and configuring at least one of the first physical resource and the second physical resource based on the higher layer signaling.

Example 44 includes the subject matter of Example 43, and optionally, the operations further including configuring the second physical resource based on the first physical resource.

Example 45 includes the subject matter of Example 43, and optionally, wherein the higher layer signaling includes NR minimum system information (MSI), NR remaining minimum system information (RMSI), NR system information block (SIB), or radio resource control (RRC) signaling.

Example 46 includes the subject matter of Example 44, and optionally, wherein the higher layer signaling includes UE-specific signaling.

Example 47 includes the subject matter of any one of Examples 35-40, and optionally, wherein the first physical resource and the second physical resource are multiplexed in a time division multiplexing (TDM) manner or in a frequency divisional multiplexing (FDM) manner or according to a combination of TDM and FDM.

Example 48 includes the subject matter of Example 47, and optionally, wherein the first physical resource and the second physical resource are multiplexed in a time division multiplexing (TDM) manner, and wherein the first physical resource is to precede the second physical resource in a time domain.

Example 49 includes the subject matter of Example 48, and optionally, wherein the first physical resource is mapped adjacent to or at each side of a physical resource carrying a demodulation reference signal (DM-RS).

Example 50 includes the subject matter of Example 49, and optionally, wherein the PUCCH includes two separate PUCCHs to carry the first CSI part and the second CSI part respectively, the two PUCCHs multiplexed in a time division multiplexing (TDM) manner in different symbols within one slot.

Example 51 includes the subject matter of any one of Examples 35-40, and optionally, wherein: the first CSI part includes rank indicator (RI), CSI resource indicator (CRI) and precoding matrix indicator (PMI), and the second CSI part includes channel quality indicator (CQI); the first CSI part includes RI and CRI, and the second CSI part includes PMI and CQI; or the first CSI part includes RI, CRI and CQI, and the second CSI part includes PMI.

Example 52 includes a device of a New Radio (NR) User Equipment, the device including: means for encoding a two part CSI including: means for encoding information bits of a first channel state information (CSI) type and information bits of a second CSI part to generate, respectively, encoded bits of a first CSI part and encoded bits of a second CSI part, a payload size of the second CSI part being based on encoded bits of the first CSI part and further being encoded separately from information bits of the first CSI part; and means for mapping the encoded bits of the first CSI part onto a first physical resource and the encoded bits of the second CSI part onto a second physical resource different from the first physical resource; and means for configuring the two part CSI in a long or short PUCCH for transmission to a NR evolved Node B (gNodeB).

Example 53 includes the subject matter of Example 52, and optionally, wherein the first physical resource and the second physical resource are based on a ratio between an amount of resources for the first CSI part and an amount of overall resources for all CSI reports on the PUCCH Example 54 includes the subject matter of Example 52, and optionally, the device further including: means for encoding information bits of a hybrid automatic repeat request (HARQ) acknowledgment (ACK) (HARQ-ACK) feedback and of a scheduling request (SR) jointly to generate, respectively, encoded HARQ-ACK bits and encoded SR bits; and means for mapping the encoded HARQ-ACK bits and SR bits to the first physical resource.

Example 55 includes a device of a New Radio (NR) evolved Node B (gNodeB), the device including a radio frequency (RF) interface, and one or more processors coupled to the RF interface and configured to: decode a two part CSI that is part of a physical uplink control channel (PUCCH), decoding including: decoding symbols of a first CSI part on a first physical resource; and decoding, based on symbols of the first CSI part, symbols of a second CSI part on a second physical resource different from the first physical resource; determine a payload size of the second CSI part based on information in the symbols of the first CSI part; and communicate with a NR User Equipment (UE) based on the two part CSI.

Example 56 includes the subject matter of Example 55, and optionally, wherein the PUCCH is a single long PUCCH or a single short PUCCH.

Example 57 includes the subject matter of Example 55, and optionally, wherein the one or more processors further to decode hybrid automatic repeat request (HARQ) acknowledgment (ACK) (HARQ-ACK) feedback symbols and scheduling request (SR) symbols on the first physical resource.

Example 58 includes the subject matter of Example 57, and optionally, wherein at least one of the encoded bits of the first CSI part, the HARQ-ACK feedback bits and the SR bits has a predetermined payload size with zero padding.

Example 59 includes the subject matter of any one of Examples 57-58, and optionally, wherein, the encoded HARQ-ACK feedback bits, the encoded SR bits and the encoded bits of the first CSI part are mapped in a same resource.

Example 60 includes the subject matter of any one of Examples 55-58, and optionally, wherein the one or more processors further configured to encode higher layer signaling for transmission to the UE, the higher layer signaling to include information to cause the UE to configure at least one of the first physical resource and the second physical resource based on the higher layer signaling.

Example 61 includes the subject matter of Example 60, and optionally, wherein the higher layer signaling is to include information to cause the UE to configure the second physical resource based on the first physical resource.

Example 62 includes the subject matter of Example 60, and optionally, wherein the higher layer signaling includes NR minimum system information (MSI), NR remaining minimum system information (RMSI), NR system information block (SIB), or radio resource control (RRC) signaling.

Example 63 includes the subject matter of Example 60, and optionally, wherein the higher layer signaling includes UE-specific signaling.

Example 64 includes the subject matter of any one of Examples 55-58, and optionally, wherein the first physical resource and the second physical resource are multiplexed in a time division multiplexing (TDM) manner or in a frequency divisional multiplexing (FDM) manner or according to a combination of TDM and FDM.

Example 65 includes the subject matter of Example 64, and optionally, wherein the first physical resource and the second physical resource are multiplexed in a time division multiplexing (TDM) manner, and wherein the first physical resource is to precede the second physical resource in a time domain.

Example 66 includes the subject matter of Example 65, and optionally, wherein the first physical resource is mapped adjacent to or at each side of a physical resource carrying a demodulation reference signal (DM-RS).

Example 67 includes the subject matter of Example 66, and optionally, wherein the PUCCH includes two separate PUCCHs carrying the first CSI part and the second CSI part respectively, the two PUCCHs multiplexed in a time division multiplexing (TDM) manner in different symbols within one slot.

Example 68 includes the subject matter of any one of Examples 55-58, and optionally, wherein: the first CSI part includes rank indicator (RI), CSI resource indicator (CRI) and precoding matrix indicator (PMI), and the second CSI part includes channel quality indicator (001); the first CSI part includes RI and CRI, and the second CSI part includes PMI and CQI; or the first CSI part includes RI, CRI and CQI, and the second CSI part includes PMI.

Example 69 includes the subject matter of any one of Examples 55-58, and optionally, further including a front-end module (FEM) coupled to the RF interface.

Example 70 includes the subject matter of Example 69, and optionally, further including at least one antenna coupled to the FEM.

Example 71 includes a method to be performed at a New Radio (NR) evolved Node B (gNodeB), the method including: decoding a two part CSI that is part of a physical uplink control channel (PUCCH), decoding including: decoding symbols of a first CSI part on a first physical resource; and decoding, based on symbols of the first CSI part, symbols of a second CSI part on a second physical resource different from the first physical resource; determining a payload size of the second CSI part based on information in the symbols of the first CSI part; and communicating with a NR User Equipment (UE) based on the two part CSI.

Example 72 includes the subject matter of Example 71, and optionally, wherein the PUCCH is a single long PUCCH or a single short PUCCH.

Example 73 includes the subject matter of Example 71, and optionally, the method further including decoding hybrid automatic repeat request (HARQ) acknowledgment (ACK) (HARQ-ACK) feedback symbols and scheduling request (SR) symbols on the first physical resource.

Example 74 includes the subject matter of Example 73, and optionally, wherein at least one of the encoded bits of the first CSI part, the HARQ-ACK feedback bits and the SR bits has a predetermined payload size with zero padding.

Example 75 includes the method of any one of Examples 73-74, and optionally, wherein the encoded HARQ-ACK feedback bits, the encoded SR bits and the encoded bits of the first CSI part are mapped in a same resource.

Example 76 includes the method of any one of Examples 71-74, and optionally, the method further including encoding higher layer signaling for transmission to the UE, the higher layer signaling to include information to cause the UE to configure at least one of the first physical resource and the second physical resource based on the higher layer signaling.

Example 77 includes the subject matter of Example 76, and optionally, wherein the higher layer signaling is to include information to cause the UE to configure the second physical resource based on the first physical resource.

Example 78 includes the subject matter of Example 76, and optionally, wherein the higher layer signaling includes NR minimum system information (MSI), NR remaining minimum system information (RMSI), NR system information block (SIB), or radio resource control (RRC) signaling.

Example 79 includes the subject matter of Example 76, and optionally, wherein the higher layer signaling includes UE-specific signaling.

Example 80 includes the method of any one of Examples 71-74, and optionally, wherein the first physical resource and the second physical resource are multiplexed in a time division multiplexing (TDM) manner or in a frequency divisional multiplexing (FDM) manner or according to a combination of TDM and FDM.

Example 81 includes the subject matter of Example 80, and optionally, wherein the first physical resource and the second physical resource are multiplexed in a time division multiplexing (TDM) manner, and wherein the first physical resource is to precede the second physical resource in a time domain.

Example 82 includes the subject matter of Example 81, and optionally, wherein the first physical resource is mapped adjacent to or at each side of a physical resource carrying a demodulation reference signal (DM-RS).

Example 83 includes the subject matter of Example 82, and optionally, wherein the PUCCH includes two separate PUCCHs carrying the first CSI part and the second CSI part respectively, the two PUCCHs multiplexed in a time division multiplexing (TDM) manner in different symbols within one slot.

Example 84 includes the method of any one of Examples 71-74, and optionally, wherein: the first CSI part includes rank indicator (RI), CSI resource indicator (CRI) and precoding matrix indicator (PMI), and the second CSI part includes channel quality indicator (001); the first CSI part includes RI and CRI, and the second CSI part includes PMI and CQI; or the first CSI part includes RI, CRI and CQI, and the second CSI part includes PMI.

Example 85 includes a product comprising one or more computer-readable storage media comprising computer-executable instructions operable to, when executed by at least one computer processor, enable the at least one computer processor to implement operations at a wireless communication device, the operations comprising: decoding a two part CSI a physical uplink control channel (PUCCH) including: decoding symbols of a first CSI part on a first physical resource; and decoding, based on symbols of the first CSI part, symbols of a second CSI part on a second physical resource different from the first physical resource; determining a payload size of the second CSI part based on information in the symbols of the first CSI part; and communicating with a NR User Equipment (UE) based on the two part CSI.

Example 86 includes the subject matter of Example 85, and optionally, wherein the computer-readable storage media are tangible and non-transitory.

Example 87 includes the subject matter of Example 85, and optionally, wherein the PUCCH is a single long PUCCH or a single short PUCCH.

Example 88 includes the subject matter of Example 85, and optionally, the operations further including decoding hybrid automatic repeat request (HARQ) acknowledgment (ACK) (HARQ-ACK) feedback symbols and scheduling request (SR) symbols on the first physical resource.

Example 89 includes the subject matter of Example 88, and optionally, wherein at least one of the encoded bits of the first CSI part, the HARQ-ACK feedback bits and the SR bits has a predetermined payload size with zero padding.

Example 90 includes the subject matter of any one of Examples 88-89, and optionally, wherein the encoded HARQ-ACK feedback bits, the encoded SR bits and the encoded bits of the first CSI part are mapped in a same resource.

Example 91 includes the subject matter of any one of Examples 88-89, and optionally, the operations further including encoding higher layer signaling for transmission to the UE, the higher layer signaling to include information to cause the UE to configure at least one of the first physical resource and the second physical resource based on the higher layer signaling.

Example 92 includes the subject matter of Example 91, and optionally, wherein the higher layer signaling is to include information to cause the UE to configure the second physical resource based on the first physical resource.

Example 93 includes the subject matter of Example 91, and optionally, wherein the higher layer signaling includes NR minimum system information (MSI), NR remaining minimum system information (RMSI), NR system information block (SIB), or radio resource control (RRC) signaling.

Example 94 includes the subject matter of Example 91, and optionally, wherein the higher layer signaling includes UE-specific signaling.

Example 95 includes the subject matter of any one of Examples 85-89, and optionally, wherein the first physical resource and the second physical resource are multiplexed in a time division multiplexing (TDM) manner or in a frequency divisional multiplexing (FDM) manner or according to a combination of TDM and FDM.

Example 96 includes the subject matter of Example 95, and optionally, wherein the first physical resource and the second physical resource are multiplexed in a time division multiplexing (TDM) manner, and wherein the first physical resource is to precede the second physical resource in a time domain.

Example 97 includes the subject matter of Example 96, and optionally, wherein the first physical resource is mapped adjacent to or at each side of a physical resource carrying a demodulation reference signal (DM-RS).

Example 98 includes the subject matter of Example 97, and optionally, wherein the PUCCH includes two separate PUCCHs carrying the first CSI part and the second CSI part respectively, the two PUCCHs multiplexed in a time division multiplexing (TDM) manner in different symbols within one slot.

Example 99 includes the subject matter of any one of Examples 85-89, and optionally, wherein: the first CSI part includes rank indicator (RI), CSI resource indicator (CRI) and precoding matrix indicator (PMI), and the second CSI part includes channel quality indicator (001); the first CSI part includes RI and CRI, and the second CSI part includes PMI and CQI; or the first CSI part includes RI, CRI and CQI, and the second CSI part includes PMI.

Example 100 includes a device of a New Radio (NR) evolved Node B (gNodeB), the device including: means for decoding a two part CSI that is part of a physical uplink control channel (PUCCH) including: decoding symbols of a first CSI part on a first physical resource; and decoding, based on symbols of the first CSI part, symbols of a second CSI part on a second physical resource different from the first physical resource; means for determining a payload size of the second CSI part based on information in the symbols of the first CSI part; and means communicating with a NR User Equipment (UE) based on the two part CSI.

Example 101 includes the subject matter of Example 100, and optionally, wherein the PUCCH is a single long PUCCH or a single short PUCCH.

Example 102 includes the subject matter of Example 100, and optionally, including means for decoding hybrid automatic repeat request (HARQ) acknowledgment (ACK) (HARQ-ACK) feedback symbols and scheduling request (SR) symbols on the first physical resource.

Example 103 includes a product comprising one or more computer-readable storage media comprising computer-executable instructions operable to, when executed by at least one computer processor, enable the at least one computer processor to perform the method of any one of Examples 19-34 and 71-84.

Example 104 includes a device comprising means for causing a wireless communication device to perform the method of any one of Examples 19-34 and 71-84.

Example 105 includes a machine-readable storage including machine-readable instructions, which, when executed, are to implement a method or realize a device as described in any preceding Example.

Example 106 includes one or more non-transitory computer-readable media comprising instructions to cause an electronic device, upon execution of the instructions by one or more processors of the electronic device, to perform one or more elements of a method described in or related to any of the preceding Examples, or any other method or process described herein.

Example 107 includes a signal as described in or related to any of the Examples above.

Example 108 includes a signal in a wireless network as shown and described herein.

Example 109 includes a method of communicating in a wireless network as shown and described herein.

Example 110 includes a system for providing wireless communication as shown and described herein.

Example 111 includes a device for providing wireless communication as shown and described herein.

What is claimed is:

1. An apparatus comprising:
a memory interface; and
one or more processors configured to:
decode a two part channel state information (CSI) that is part of a physical uplink control channel (PUCCH), the decoding including:
decoding symbols of a first CSI part on a first physical resource of the two part CSI and decoding symbols of a second CSI part on a second physical resource of the two part CSI, wherein the first physical resource and the second physical resource are multiplexed in a time division multiplexing (TDM) manner and the first physical resources precedes the second physical resource in a time domain;
decoding bits of a hybrid automatic repeat request (HARQ) acknowledgment (ACK) (HARQ-ACK) feedback and decoding bits of a scheduling request (SR) from the first physical resource; and
communicate with a user equipment (UE) based on the two part CSI.

2. The apparatus of claim 1, wherein at least one of the bits of the HARQ-ACK feedback or the bits of the SR are encoded with zero padding.

3. The apparatus of claim 1, wherein symbols of the second CSI part are decoded based on symbols of the first CSI part.

4. The apparatus of claim 1, wherein the one or more processors are further configured to:
determine a payload size of the second CSI part based on information in the symbols of the first CSI part and wherein the symbols of the second CSI part are decoded separately from the symbols of the first CSI part.

5. The apparatus of claim 1, wherein the first physical resource is different from the second physical resource.

6. The apparatus of claim 1, wherein the bits of the HARQ-ACK feedback and the bits of the SR are mapped to the first physical resource.

7. The apparatus of claim 1, wherein the HARQ-ACK feedback, the SR, and the first CSI part are mapped to a same resource.

8. An apparatus, comprising:
a memory interface; and
one or more processors, coupled to the memory interface and configured to:
encode a two part channel state information (CSI) including:
encoding information bits of a first CSI part and information bits of a second CSI part to generate, respectively, encoded bits of the first CSI part and encoded bits of the second CSI part; and
mapping the encoded bits of the first CSI part onto a first physical resource and the encoded bits of the second CSI part onto a second physical resource, wherein the first physical resource and the second physical resource are multiplexed in a time division multiplexing (TDM) manner and the first physical resources precedes the second physical resource in a time domain;
encode information bits of a hybrid automatic repeat request (HARQ) acknowledgment (ACK) (HARQ-ACK) feedback and of a scheduling request (SR) jointly to generate, respectively, encoded HARQ-ACK bits and encoded SR bits, wherein the HARQ-ACK bits and the SR bits are mapped to the first physical resource; and
outputting, for transmission to a base station (BS), the two part CSI in a physical uplink control channel (PUCCH).

9. The apparatus of claim 8, wherein a payload size of the second CSI part is based on encoded bits of the first CSI part.

10. The apparatus of claim 8, wherein the second CSI part is encoded separately from the first CSI part.

11. The apparatus of claim 8, wherein the second physical resource is different from the first physical resource.

12. The apparatus of claim 8, wherein the PUCCH is a long PUCCH or a short PUCCH.

13. The apparatus of claim 8, wherein the one or more processors is further to jointly encode information bits of the HARQ-ACK feedback and information bits of the SR with information bits of the first CSI part.

14. The apparatus of claim 8, wherein the one or more processors are further configured to map the encoded HARQ-ACK bits, the encoded SR bits and the encoded bits of the first CSI part in a same resource.

15. The apparatus of claim 8, wherein the first physical resource is mapped adjacent to or at each side of a physical resource carrying a demodulation reference signal (DM-RS).

16. The apparatus of claim 8, wherein the first physical resource and the second physical resource are multiplexed according to a combination of TDM and a frequency divisional multiplexing (FDM) manner.

17. A base station (BS), comprising:
a memory interface; and
one or more processors configured to:
decode a two part channel state information (CSI) that is part of a physical uplink control channel (PUCCH), the decoding including:
decoding symbols of a first CSI part on a first physical resource of the two part CSI and decoding symbols of a second CSI part on a second physical resource of the two part CSI wherein the first physical resource and the second physical resource are multiplexed in a time division multiplexing (TDM) manner and the first physical resources precedes the second physical resource in a time domain;
decoding bits of a hybrid automatic repeat request (HARQ) acknowledgment (ACK) (HARQ-ACK) feedback and decoding bits of a scheduling request (SR) that are mapped to the first physical resource; and
communicate with a user equipment (UE) based on the two part CSI.

18. The BS of claim 17, wherein at least one of the first CSI part, the HARQ-ACK feedback, the second CSI part, or the SR are encoded with zero padding.

19. The BS of claim 17, wherein the PUCCH is a short PUCCH or a long PUCCH.

* * * * *